United States Patent [19]

Arakawa et al.

[11] Patent Number: 4,944,026
[45] Date of Patent: * Jul. 24, 1990

[54] RADIATION IMAGE STORAGE PANEL

[75] Inventors: Satoshi Arakawa, Minami-ashigara; Kenji Takahashi, Odawara; Yuichi Hosoi, Chigasaki, all of Japan

[73] Assignee: Fuji Photo Film Co., Ltd., Minami-ashigara, Japan

[*] Notice: The portion of the term of this patent subsequent to Jun. 5, 2007 has been disclaimed.

[21] Appl. No.: 225,668

[22] Filed: Jul. 26, 1988

Related U.S. Application Data

[63] Continuation of Ser. No. 5,666, Jan. 21, 1987, abandoned.

[30] Foreign Application Priority Data

| Jan. 21, 1986 | [JP] | Japan | 61-11296 |
| Jan. 22, 1986 | [JP] | Japan | 61-11558 |
| Jan. 22, 1986 | [JP] | Japan | 61-11559 |
| Jan. 22, 1986 | [JP] | Japan | 61-11560 |
| Jan. 22, 1986 | [JP] | Japan | 61-11561 |
| Jan. 22, 1986 | [JP] | Japan | 61-11562 |
| Dec. 27, 1986 | [JP] | Japan | 61-309759 |

[51] Int. Cl.$^5$ ............................................. G03B 42/00
[52] U.S. Cl. ............................. 250/484.1; 250/327.2; 250/487.1; 250/488.1
[58] Field of Search ............ 250/327.2 A, 484.1 B, 250/488.1, 487.1

[56] References Cited

U.S. PATENT DOCUMENTS

| 3,859,527 | 1/1975 | Luckey | 250/327.2 |
| 4,236,078 | 11/1980 | Kotera et al. | 250/363 R |
| 4,239,968 | 12/1980 | Kotera et al. | 250/327.2 |
| 4,302,671 | 11/1981 | Kato et al. | 250/327.2 |
| 4,350,893 | 9/1982 | Takahashi et al. | 250/484.1 |
| 4,368,390 | 1/1983 | Takahashi et al. | 250/363 R |
| 4,380,702 | 4/1983 | Takahashi et al. | 250/327.2 |
| 4,394,581 | 7/1983 | Takahashi et al. | 250/484.1 |
| 4,483,899 | 11/1984 | Kuwabara | 428/213 |
| 4,491,736 | 1/1985 | Teraoka | 250/484.1 |
| 4,505,989 | 3/1985 | Umemoto et al. | 428/691 |
| 4,564,760 | 1/1986 | Noguchi et al. | 250/327.2 |
| 4,575,635 | 3/1986 | Arakawa et al. | 250/484.1 |
| 4,621,196 | 11/1986 | Arakawa | 250/483.1 |
| 4,645,721 | 2/1987 | Arakawa et al. | 428/690 |
| 4,661,704 | 4/1987 | de Leeuw et al. | 250/327.2 |

FOREIGN PATENT DOCUMENTS

| 0126564 | 11/1984 | European Pat. Off. | 250/484.1 |
| 270042 | 5/1927 | United Kingdom . | |

Primary Examiner—Constantine Hannaher
Attorney, Agent, or Firm—Sixbey, Friedman, Leedom & Ferguson

[57] ABSTRACT

A radiation image storage panel comprising a phosphor layer which contains a stimulable phosphor, characterized in that one surface of said phosphor layer is provided with a multi-layer optical filter which has a transmittance of not less than 70% for the light of the stimulation wavelength of said stimulable phosphor and at an incident angle in the range of 0°–5° and has a reflectance of not less than 60% for the light of said stimulation wavelength and at an incident angle of not smaller than 30°.

15 Claims, 14 Drawing Sheets

RADIATION IMAGE STORAGE PANEL

This application is a continuation of Ser. No. 005,666, filed Jan. 21, 1987, now abandoned.

BACKGROUND OF THE INVENTION

1. Field of the Invention

The present invention relates to a radiation image storage panel employed in a radiation image recording and reproducing method utilizing a stimulable phosphor.

2. Description of the Prior Art

For obtaining a radiation image, there has been conventionally employed a radiography utilizing a combination of a radiographic film having an emulsion layer containing a photosensitive silver salt material and an intensifying screen. As a method replacing the conventional radiography, a radiation image recording and reproducing method utilizing a stimulable phosphor as described, for instance, in U.S. Pat. No. 4,239,968, has been recently paid much attention. In this method, a radiation image storage panel comprising a stimulable phosphor (i.e., stimulable phosphor sheet) is used, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at considerably smaller dose, as compared with the conventional radiography. Accordingly, this method is of great value especially when the method is used for medical diagnosis.

The radiation image storage panel employed in the above-described method has a basic structure comprising a support and a phosphor layer provided on one surface of the support. Further, a transparent film of a polymer material is generally provided on the free surface (surface not facing the support) of the phosphor layer to keep the phosphor layer from chemical deterioration or physical shock.

The phosphor layer generally comprises a binder and stimulable phosphor particles dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photoelectrically detected to give electric signals, so as to reproduce a visible image from the electric signals.

The radiation image recording and reproducing method is very useful for obtaining a radiation image as a visible image as described hereinbefore, and it is desired for the radiation image storage panel employed in the method to have a high sensitivity and provide an image of high quality (high sharpness, high graininess, etc.), as well as the radiographic intensifying screen employed in the conventional radiography. Especially when the object is a human body, the sensitivity of the panel is desired to be increased, even if the level is low, for the purpose of reducing the radiation dose applied to the human body.

The sensitivity of the radiation image storage panel is essentially determined by the amount of stimulated emission given by the stimulable phosphor contained in the panel, and the emission amount varies depending upon not only the emission characteristics of the phosphor per se but also an intensity of stimulating rays for causing the phosphor to give stimulated emission when the intensity thereof is not sufficient.

In the radiation image recording and reproducing method, the radiation image storage panel is practically read out by scanning the surface of the panel with stimulating rays such as a laser beam. A portion of the stimulating rays is scattered in the panel, particularly in the phosphor layer, and released from the panel surface without exciting the stimulable phosphor, so that the phosphor is not sufficiently excited with the stimulating rays and the stimulating rays are not always employed efficiently in the method. Especially in the case of using a laser having a small power as a source of stimulating rays, it is desired to efficiently employ stimulating rays so as to enhance the sensitivity of the panel.

There has been filed a patent application for a radiation image storage panel on the surface of which an anti-reflecting film comprises an inorganic material or the like is provided (Japanese Patent Provisional Publication No. 61(1986)-164200, whose content is described in U.S. patent application No. 818,239 now U.S. Pat. No. 4,645,721 and in European Patent Application No. 86100417.4). The provision of the anti-reflecting film is intended to prevent the irradiated stimulating rays from being reflected by the panel surface and the anti-reflecting film is a thin film merely having a low reflectance for the stimulating rays.

SUMMARY OF THE INVENTION

It is an object of the present invention to provide a radiation image storage panel improved in the sensitivity.

It is another object of the present invention to provide a radiation image storage panel having a high sensitivity and giving an image of improved shapness.

The present invention provides:

[1] a radiation image storage panel comprising a phosphor layer which contains a stimulable phosphor, characterized in that a surface of said phosphor layer is provided with a multi-layer optical filter which has a transmittance of not less than 70% for the light of the stimulation wavelength of said stimulable phosphor and at an incident angle in the range of 0°–5° and has a reflectance of not less than 60% for the light of said stimulation wavelength and at an incident angle of not smaller than 30°;

[2] a radiation image storage panel comprising a support on one side of which plural recessed parts charged with a stimulable phosphor are regularly provided, and a multi-layer optical filter provided on said side of the support, which has a transmittance of not less than 70% for the light of the stimulation wavelength of said stimulable phosphor and at an incident angle in the range of 0°–5° and has a reflectance of not less than 60% for the light of said stimulation wavelength and at an incident angle of not smaller than 30°; and

[3] a radiation image storage panel comprising a phosphor layer which contains a stimulable phosphor, characterized in that one surface of said phosphor layer is provided with a multi-layer optical filter (1) which has a transmittance of not less than 70% for the light of the stimulation wavelength of said stimulable phosphor and at an incident angle in the range of 0°–5° and has a reflectance of not less than 60% for the light of said stimulation wavelength and at an incident angle of not smaller than 30°, and the other surface of said phosphor layer is provided with a multi-layer optical filter (2) which has a reflectance of not less than 60% for the light of said stimulation wavelength.

The term "an incident angle" used herein means an angle with a vertical line against the plane of incidence. The incident angle can range from 0° to 90°.

In the present invention, a multi-layer optical filter (optical filter composed of a multi-layer film) having the transmittance and the reflectance both depending upon an angle of incidence with respect to the light at the stimulation wavelength of a stimulable phosphor contained in the radiation image storage panel is provided on the phosphor layer (or on the support provided with recessed part, namely microcells, charged with the phosphor) of the panel, whereby the utilization efficiency of stimulating rays is increased and the sensitivity of the panel is remarkably improved.

The multi-layer optical filter used in the invention mainly includes a transmissive filter and a reflective filter with respect to the light of wavelength of the stimulated emission given by the stimulable phosphor.

The radiation image storage panel is generally read out from the panel surface (i.e., phosphor layer-side surface), and in the read-out procedure the panel surface is irradiated with stimulating rays such as a laser beam in a direction nearly perpendicular thereto. On the other hand, most of stimulating rays scattered in the panel advance at an angle towards the panel surface, that is, in the opposite direction of the incident direction.

In the radiation image storage panel of the present invention, the surface of the phosphor layer (or the surface of the support on the side provided with microcells charged with the phosphor) is provided with the multi-layer optical filter having such angle-dependent transmission and reflection characteristics that the optical filter allows the stimulating rays to pass therethrough when the incident angle of the rays is small (namely, nearly perpendicular to plane of incidence), while the optical filter does not allow the stimulating rays to pass therethrough but it reflects the rays when the incident angle is large (namely, oblique incidence). In the reading out, the filter-side surface of the panel is irradiated with the stimulating rays, and thereby the stimulating rays can be passed through the panel surface, but the stimulating rays scattered at an angle in the panel are reflected on the surface of the filter without passing through the filter and again travel into the phosphor layer.

In the case of a multi-layer optical filter transmissive for the light emitted by the stimulable phosphor, the emitted light passes through the multi-layer optical filter and is detected by a detector placed over the panel, namely the detection of light is made on the filter-side of the panel. On the contrary, in the case of a multi-layer optical filter reflective for the emitted light, a part of the emitted light, which is directed to the optical filter is reflected on the filter surface is also detected by a detector placed over the panel oppositely to the filter side, namely the detection of light is made on the side of the panel not providing with the filter.

As a result, it can be reduced that the stimulating rays scattered in the panel escape from the panel and are lost without making any contribution to the excitation of the stimulable phosphor. The proportion of reading out information stored in the excited stimulable phosphor (i.e., trapped electrons) can be increased. In other words, the amount of stimulated emission given by the phosphor is highly increased by confining the stimulating rays in the panel and hence, the sensitivity of the panel can be prominently enhanced as compared with the conventional one.

When the panel of the present invention has the same sensitivity as the conventional one, the phosphor layer of the panel can be made thinner and an image of high sharpness can be obtained. Quantum noises of radiation can be reduced owing to the increase of the amount of absorption thereof per the area of the phosphor layer and an image of good graininess can be obtained.

Further, even when the panel is irradiated with low-intensity stimulating rays, the amount of stimulated emission given by the phosphor in the panel can be kept largely and hence the sensitivity of the panel can be highly improved. Especially when a source of stimulating rays has a small power, or the intensity of stimulating rays are unable to be increased because of read-out conditions, etc., it is very advantageous to increase the utilization efficiency of the stimulating rays for the radiation image storage panel.

Accordingly, employment of the panel of the present invention can relax restrictions on the source of stimulating rays or read-out system, so that a radiation image recording and reproducing device used in reading out the panel can be readily improved, for instance, in making its size smaller and in the high-speed reading. The radiation image recording and reproducing method using the panel of the invention can be applied in a wide range.

When a multi-layer optical filter made of fluoride such as magnesium fluoride is provided on the panel surface (on the phosphor layer not facing the support, or on the protective film not facing the phosphor layer, which is also included in the present invention), the resulting panel can be prevented from suffering damages because the filter has a relatively high hardness. The multi-layer optical filter also serves as a protective film. When the detection of the light released from the panel (the read-out of the image information) is done from the same side of the panel as that of the irradiation of stimulating rays, the deterioration of image quality can be also prevented by this improvement in damage-resistance of the panel surface.

Furthermore, when another type of multi-layer optical filter [filter (2)] which has the reflectance with respect to the light of stimulation wavelength of the stimulable phosphor contained in the panel is provided on the other surface of the phosphor layer, in addition to providing the afore-described multi-layer optical filter [filter (1)] which has the angle-dependent transmittance and reflectance on one surface of the phosphor layer, the utilization efficiency of stimulating rays is increased and the sensitivity of the panel is more improved.

More in detail, the panel is irradiated on the side provided with the filter (1) with the stimulating rays in the read-out procedure, and the stimulating rays scattered at an angle in the panel are reflected on the surfaces of both filters (1) and (2) without passing through the filters and the stimulating rays passing through the phosphor layer without exciting the phosphor is also reflected on the surface of filter (2), whereby these rays again travel into the phosphor layer.

When the filter (1) is reflective and the filter (2) is transmissive for the light emitted by the stimulable phosphor, the emitted light passes through the filter (2) and is detected by a detector set facing to the panel, namely, the detection of light is made on the side provided with the filter (2) of the panel, opposite to the side of the stimulating rays entering. The emitted light directed to the incidence side (opposite to the detection side) is reflected on the filter (1) and further detected by the detector.

As a result, such loss of the stimulating rays that the rays do not contribute to the excitation of the stimulable phosphor and escape from the panel can be prevented in addition to the prevention of the loss of scattered stimulating rays, so that the proportion of excited stimulable phosphor can be increased. In other words, the amount of stimulated emission given by the phosphor is noticeably increased by confining the stimulating rays more completely in the panel and hence, the sensitivity of the panel can be prominently enhanced as compared with the conventional one.

The multi-layer optical filter (2) is reflective for the stimulating rays and transmissive for the emitted light, so that only the emitted light passes through the filter (2) and is detected, the stimulating rays not passing therethrough. The separation of wavelength is not necessary in the detection of light and setting of the means therefor is not required, even when the wavelength of the emitted light is close to that of the stimulating rays.

DETAILED DESCRIPTION OF THE INVENTION

Figure 2:
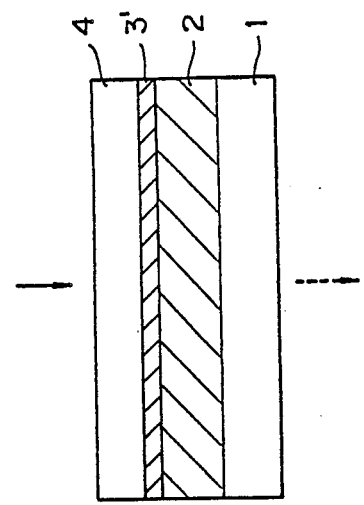
FIGS. 1 to 6 are cross-sectional views showing embodiments of the radiation image storage panel according to the present invention.
Figure 3:
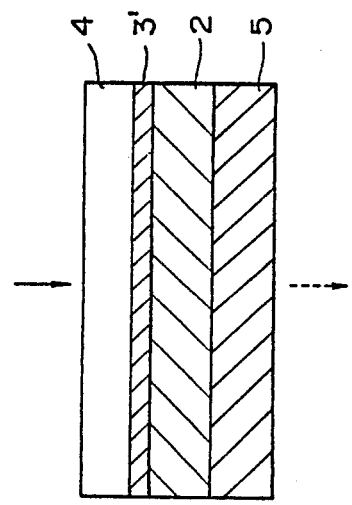
Figure 1:
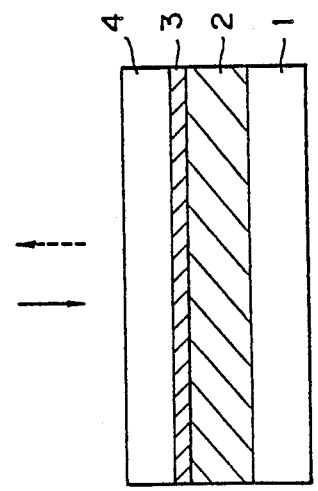

Representative embodiments of the radiation image storage panel of the present invention having the above-mentioned favorable characteristics are shown in FIGS. 1 to 3.

FIGS. 1 to 3 are sectional views illustrating structures of the radiation image storage panel according to the invention. In FIG. 1, the panel comprises a support 1, a phosphor layer 2, a multi-layer optical filter [filter (1)] 3 and protective film 4, superposed in this order. The multi-layer optical filter 3 is transmissive for the light of the wavelength of the stimulated emission of the stimulable phosphor. The irradiation of stimulating rays is carried out on the protective film-side (in FIG. 1, indicated by an arrow drawn by solid line→) and the detection of emitted light is carried out on the same side (in FIG. 1, indicated by an arrow drawn by dotted line ).

In FIG. 2, the panel comprises a support 1, a phosphor layer 2, a multi-layer optical filter [filter (1)] 3' and protective film 4, superposed in this order. The multi-layer optical filter 3' is reflective for the light of the wavelength of the stimulated emission. The irradiation of stimulating rays is carried out on the protective film-side (→) and the detection of emitted light is carried out on the support side ( ).

In FIG. 3, the panel comprises a multi-layer optical filter [filter (2)] 5, a phosphor layer 2, a multi-layer optical filter [filter (1)] 3' and protective film 4, superposed in this order. The multi-layer optical filter 3' is reflective for the light of the wavelength of the stimulated emission and contrarily the multi-layer optical filter 5 is transmissive therefor. The irradiation of stimulating rays is carried out on the protective film-side (→) and the detection of emitted light is carried out on the filter (2) side ( ).

Figure 4:
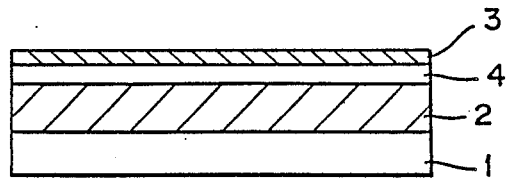
Figure 5:
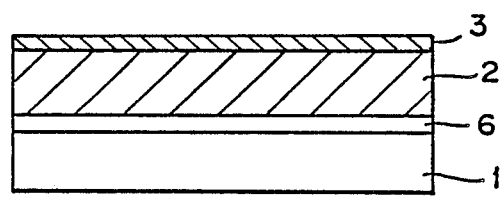

The above-mentioned embodiments are by no means given to restrict the panel of the invention, and any structure can be applied to the panel of the invention as far as the multi-layer optical filter(s) is provided on either or both surfaces of the phosphor layer. For instance, as shown in FIG. 4, the multi-layer optical filter 3 may be provided on the protective film 4 and this structure is also included within the scope of the invention. A light-reflecting layer may be provided between the support and the phosphor layer, as shown in FIG. 5.

Figure 6:
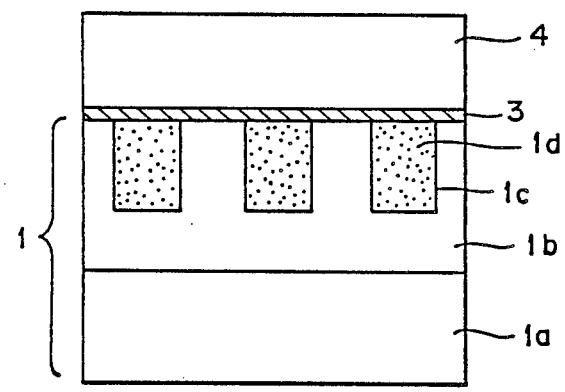

Alternatively, as shown in FIG. 6, the panel comprises a support 1, a multi-layer optical filter 3 and a protective film 4, and the support 1 comprises a substrate 1a and a light-reflecting layer 1b, the surface of which is regularly provided with a great number of recessed parts (microcells) 1c and a stimulable phosphor 1d filled each of recessed parts 1c. In this case, the filter is required to be provided on the support surface on the side having the recessed parts.

Further, the support and/or the protective film may not be provided, or other additional layers such as a subbing layer and an intermediate layer may be provided between the support and the phosphor layer.

The radiation image storage panel of the present invention, in which a multi-layer optical filter (1) is provided on one surface of a phosphor layer, can be prepared, for instance, by a process described below.

A support material employable in the invention can be selected from those employed in the conventional radiographic intensifying screens or those employed in the known radiation image storage panels. Examples of the support material include a glass plate, plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material and handling thereof, a plastic film and a glass plate are preferably employed as the support material in the invention. The plastic film may contain a light-absorbing material such as carbon black, or may contain a light-reflecting material such as titanium dioxide. The former is appropriate for preparing a high-sharpness type panel, while the latter is appropriate for preparing a high-sensitivity type panel.

In the case of detecting the emitted light from the support side, support materials capable of transmitting the emitted light are employed.

In the known radiation image storage panel, one or more additional layers are occasionally provided between the support and the phosphor layer. For instance, a subbing layer or an adhesive layer may be provided by coating a polymer material such as gelatin over the surface of the support on the phosphor layer-side to enhance the adhesion therebetween. A light-absorbing layer may be provided on the support by forming a layer containing a light-absorbing material such as carbon black to improve the quality of an image (sharpness and graininess) provided by the panel.

Otherwise, a light-reflecting layer which contains a light-reflecting material may be provided on the support to improve the sensitivity of the panel.

The light-reflecting material employable in the invention can be selected form those described in U.S. Pat. No. 4,380,702 and U.S. patent application No. 586,691. Examples of the light-reflecting material include metals such as aluminum and aluminum alloy; white pigments such as $TiO_2$, $2PbCO_3 \cdot Pb(OH)_2$, $ZnS$, $Al_2O_3$ and $MgO$; and alkaline earth metal fluorohalides such as BaFBr, BaFCl, SrFBr, SrFCl, CaFBr and CaFCl. Polymer particles of hollow structure made of a stylene polymer and/or an acrylic polymer can be also employed, as described in Japanese Patent Application No. 60(1985)-278665.

The light-reflecting layer is formed by a vacuum deposition method using these metals, a lamination method using the metal foils, or a coating method using the white pigments, which comprises coating a coating dispersion containing the white pigment and an appropriate binder and drying. The binder employable is aqueous polymers such as acrylic acid ester copolymers and can be also selected from binders employable in the preparation of a phosphor layer as mentioned below.

The ratio between the binder and the light-reflecting material in the coating dispersion is within the range of from 1:1 to 1:50 (binder:material, by weight). From the viewpoint of the adhesion between the support and the light-reflecting layer, the ratio therebetween is preferably within the range of from 1:2 to 1:20, by weight. The above-described materials may be employed alone or in combination. The thickness of the light-reflecting layer is preferably within the range of from 5 to 100 $\mu m$.

When the light-reflecting layer is provided, the multi-layer optical filter is provided on the surface of the phosphor layer not facing the light-reflecting layer, as shown in FIG. 5. In the resulting radiation image storage panel, the light which is emitted by a stimulable phosphor and directed to the direction of the support is reflected on the light-reflecting layer and travels towards the panel surface (to the direction of the filter) without being absorbed by the support or passing therethrough. Thus, the amount of the reflected light is increased together with the amount of the stimulated emission, the increase of which is due to the high efficiency of the excitation of the phosphor, so that both can contribute to the enhancement of the sensitivity of the panel.

The phosphor layer-side surface of the support (or the surface of an adhesive layer, light-reflecting layer or light-absorbing layer in the case that such layers are provided on the surface of the support) may be provided with protruded and depressed portions for enhancement of the sharpness of an image, as described in U.S. Pat. No. 4,575,635.

Subsequently, on the support is provided a phosphor layer. The phosphor layer contains a stimulable phosphor, that is, the phosphor layer may comprises a binder and a stimulable phosphor dispersed therein or may consist essentially of a stimulable phosphor. In the latter case, trace amount of a binder, etc. can be contained in the phosphor layer.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, $BaO \cdot xAl_2O_3$:Eu, in which x is a number satisfying the condition of $0.8 \leq x \leq 10$, and $M^{2+}O \cdot xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,236,078;

$(Ba_{1-x-y}, Mg_x, Ca_y)FX:aEu^{2+}$, in which X is at least one element selected from the group consisting of Cl and Br, x and y are numbers satisfying the conditions of $0 < x+y \leq 0.6$ and $xy \neq 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in U.S. Pat. No. 4,236,078;

$(Ba_{1-x}, M^{2+}{}_x)FX:yA$, in which $M^{2+}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, as described in U.S. Pat. No. 4,239,968;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leq x \leq 0.5$ and $0 < y \leq 0.2$, respectively, as described in Japanese Patent Provisional Publication No. 55(1980)-160078;

$(Ba_{1-x}, M^{II}{}_x)F_2.aBaX_2:yEu, zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 10^{-2}$, respectively, as described in Japanese Patent Provisional Publication No. 56(1981)-116777;

$(Ba_{1-x}, M^{II}{}_x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 2 \times 10^{-1}$, respectively, as described in Japanese Patent Provisional Publication No. 57(1982)-23673;

$(Ba_{1-x}, M^{II}{}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 5 \times 10^{-1}$, respectively, as described in Japanese Patent Provisional Publication No. 57(1982)-23675;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$, as described in Japanese Patent Provisional Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively, as described in U.S. patent application No. 497,805 which is pending under U.S. application Ser. No. 387,427;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leq x \leq 0.1$ and $0 < y \leq 0.1$, respectively, as described in U.S. patent application No. 520,215 now abandoned;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively, as described in U.S. patent application No. 502,648 which is pending under U.S. application Ser. No. 088,532;

$BaFX.xNaX':aEu^{2+}$, in which each of X and X' is at least one halogen selected from the group consisting of Cl, Br and I; and x and a are numbers satisfying the conditions of $0 < x \leq 2$ and $0 < a \leq 0.2$, respectively, as described in Japanese Patent Provisional Publication No. 59(1984)-56479;

$M^{II}FX.xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively, as described in U.S. patent application No. 535,928 now U.S. Pat. No. 4,505,989;

$M^{II}FX.aM^{I}X'.bM'^{II}X''_2.cM^{III}X'''_3.xA:yEu^{2+}$, in which $M^{II}$ is at least one alkaline earth metal selected from the group consisting of Ba, Sr and Ca; $M^I$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \leq 10^{-6}$; and x and y are numbers satisfying the conditions of $0 < x \leq 0.5$ and $0 < y \leq 0.2$, respectively, as described in U.S. patent application No. 543,326 which was pending under U.S. application Ser. No. 110,025;

$M^{II}X_2.aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively, as described in U.S. patent application No. 660,987 which was pending under U.S. application Ser. No. 336,553;

$M^{II}FX.aM^{I}X':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 \leq a \leq 4.0$ and $0 < x \leq 0.2$, respectively, as described in U.S. patent application No. 668,464 which was pending under U.S. application Ser. No. 383,240;

$M^{I}X:xBi$, in which $M^{I}$ is at least one alkali metal selected from the group consisting of Rb and Cs; X is at least one halogen selected from the group consisting of Cl, Br and I; and x is a number satisfying the condition of $0 < x \leq 0.2$, as described in U.S. patent application No. 846,919 now U.S. Pat. No. 4,780,375; and alkali metal halides described in Japanese Patent Provisional Publications No. 61(1986)-72087 and No. 61(1986)-72088.

The $M^{II}X_2.aM^{II}X'_2:xEu^{2+}$ phosphor described in the above-mentioned U.S. patent application No. 660,987 which was pending under U.S. application Ser. No. 336,553 may contain the following additives in the following amount per 1 mol of $M^{II}X_2.aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0 < b \leq 10.0$, as described in U.S. patent application No. 699,325 now abandoned;

$bKX''.cMgX'''_2.dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leq b \leq 2.0$, $0 \leq c \leq 2.0$, $0 \leq d \leq 2.0$ and $2 \times 10^{-5} \leq b+c+d$, as described in U.S. patent application No. 723,819 now abandoned;

yB, in which y is a number satisfying the condition of $2 \times 10^{-4} \leq y \leq 2 \times 10^{-1}$, as described in U.S. patent application No. 727,974 which was pending under U.S. application Ser. No. 147,573;

bA, in which A is at least one oxide selected from the group consisting of $SiO_2$ and $P_2O_5$; and b is a number satisfying the condition of $10^{-4} \leq b \leq 2 \times 10^{-1}$, as described in U.S. patent application No. 727,972 which was pending under U.S. application Ser. No. 240,457;

bSiO, in which b is a number satisfying the condition of $0 < b \leq 3 \times 10^{-2}$, as described in U.S. patent application No. 797,971 which was pending under U.S. application Ser. No. 319,855;

$bSnX''_2$, in which X'' is at least one halogen selected from the group consisting of F, Cl, Br and I; and b is a number satisfying the condition of $0 < b \leq 10^{-3}$, as described in U.S. patent application No. 797,971 which was pending under U.S. application Ser. No. 319,855;

$bCsX''.cSnX'''_2$, in which each of X'' and X''' is at least one halogen selected from the group consisting of F, Cl, Br and I; and b and c are numbers satisfying the conditions of $0 < b \leq 10.0$ and $10^{-6} \leq c \leq 2 \times 10^{-2}$, respectively, as described in U.S. patent application No. 850,715 which was pending under U.S. application Ser. No. 381,699; and $bCsX''.yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0 < b \leq 10.0$ and $10^{-6} \leq y \leq 1.8 \times 10^{-1}$, respectively, as described in U.S. patent application No. 850,715 which was pending under U.S. application Ser. No. 381,699.

Among the above-described stimulable phosphors, the divalent europium activated alkaline earth metal halide phosphor and rare earth element activated rare earth oxyhalide phosphor are particularly preferred, because these phosphors show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

In the case of the phosphor layer comprising a stimulable phosphor and a binder, the phosphor layer can be formed on the support, for instance, by the following procedure.

In the first place, stimulable phosphor particles and a binder are added to an appropriate solvent, and then they are mixed to prepare a coating dispersion of the phosphor particles in the binder solution.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethylether; and mixtures of the above-mentioned compounds.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of the support to form a layer of the coating dispersion. The coating procedure can be carried out by a conventional method such as a method using a doctor blade, a roll coater or a knife coater.

After applying the coating dispersion to the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within a range of from 20 μm to 1 mm, preferably from 50 to 500 μm.

The phosphor layer can be provided onto the support by the methods other than that given in the above. for instance, the phosphor layer is initially prepared on a sheet (false support) such as a glass plate, a metal plate or a plastic sheet using the aforementioned coating dispersion and then thus prepared phosphor layer is overlaid on the genuine support by pressing or using an adhesive agent.

In the case of the phosphor layer consisting essentially of a stimulable phosphor, the phosphor layer can be formed on the support, for instance, by a deposition method such as vacuum deposition or by a sintering method.

Figure 7:
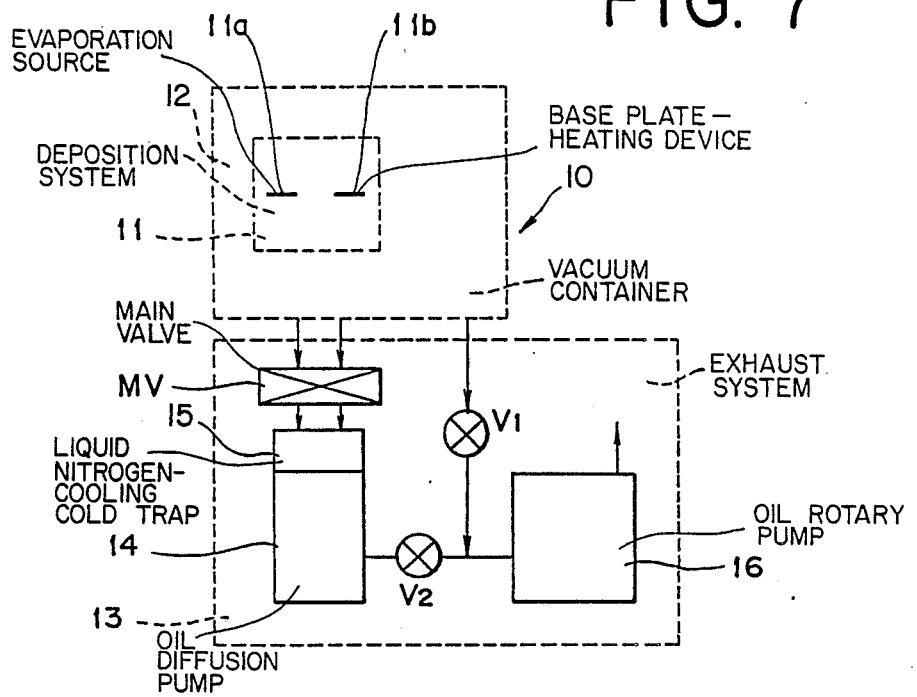
FIG. 7 is a schematic view showing a vacuum deposition apparatus employed in the preparation of the radiation image storage panel of the invention.

The vacuum deposition is carried out by using a vacuum deposition apparatus as shown in FIG. 7.

FIG. 7 is a schematic view illustrating a representative example of vacuum deposition apparatus.

In FIG. 7, the vacuum deposition apparatus 10 comprises a vacuum container 12 in which a deposition system 11 for performing vacuum deposition is enclosed to constitute a body, and an exhaust system 13 for making the container 12 vacuum. The exhaust system 13 comprises an oil diffusion pump 14, a liquid nitrogen-cooling cold trap 15 and an oil rotary pump 16. The exhaust system 13 is connected to the body by means of a main valve (MV) and other valves ($V_1$ and $V_2$). The deposition system 11 includes an evaporation source 11a and a base plate-heating device 11b.

The stimulable phosphor particles are introduced into a molybdenum boat being the evaporation source 11a, equipped in the deposition system 11. The base plate (support) that is a material to be deposited is also fixed in the defined place of the deposition system 11. The exhaust system 13 is driven to perform deposition of the phosphor particles onto the base plate by setting a vapor pressure within the vacuum container 12 to the fixed pressure (not higher than $10^{-6}$ Torr).

The deposition is carried out by a process comprising the steps of initially heating the base plate at the defined temperature (e.g., approx. 25°–400° C.), driving the exhaust system 13, and then heating the molybdenum boat. The deposition rate of the phosphor particles is generally in the range of approx. 200–4,400 angstrom/min. Thus, a film composed of deposited stimulable phosphor is formed on the base plate.

The base plate (support) is generally subjected to a cleaning treatment prior to performing the deposition. Conventional cleaning methods can be employed and examples thereof include an ultrasonic cleaning method, a vapor cleaning method and a combination thereof. In these methods, cleaning agents, chemicals, solvents, etc. are appropriately employed.

The formation of the phosphor layer by vacuum deposition can be carried out concretely by utilizing a method described in P. F. Carcia and L. H. Brixner, Electronics and Optics, Thin Solid Film, 115(1984) 89–95.

The thickness of the phosphor layer (depositing layer) varies depending upon the characteristics of the aimed radiation image storage panel and the nature of the phosphor. Generally, the thickness of the phosphor layer is within the range of from 10 to 500 μm, and preferably from 20 to 250 μm.

The surface of the phosphor layer prepared by the deposition method has high smoothness, and hence it is prominently advantageous to provide thereon a multi-layer optical filter. Since the phosphor layer does not contain a binder and comprises a stimulable phosphor at a high density, the amount of stimulated emission per unit area can be increased. As a result, the thickness of the phosphor layer can be made smaller to improve the quality of an image provided by the panel without lowering the sensitivity of the panel. Further, the amount of a radiation absorbable therein is larger than a phosphor layer which comprises a binder and a stimulable phosphor. Hence, the sensitivity of the panel is more enhanced. The contamination of air which is apt to occur during dispersing the phosphor in the binder is also prevented, so that the scattering of stimulating rays and emitted light is reduced and the sensitivity of the panel is further enhanced.

It is required that a substrate on which a multi-layer optical filter is formed is heat-resistant (approx. 300°–500° C.), to prepare multi-layer optical filters such as a band pass filter and a dichroic filter having the good quality. When the phosphor layer comprises the deposited phosphor or the sintered phorphor, the multi-layer optical filter can be formed directly thereon or after providing a protective film comprisng an inorganic material such as glass thereon, owing to organic materials such as the binder not being contained in the phosphor layer.

In stead of the structure comprising a support and a phosphor layer (or only a phosphor layer) as described above, a structure that plural recessed parts each of which is charged with a stimulable phosphor are regularly provided on one surface of a support, as shown in FIG. 6, can be also employed in the radiation image storage panel of the present invention.

The substrate constituting the support in the present invention is preferably one which has a low radiation (e.g. X-rays) absorptivity and excellent processability. By using such substrate, the loss of a radiation in the support is reduced and a lot of fine recessed parts can be regularly formed on the surface of the support. From the viewpoint of graininess, it is preferred to use a material having a low coefficient of linear expansion so that the shape of the recessed part is not so much deformed by temperature change.

Examples of the substrate material include organic high-molecular materials comprising carbon, hydrogen and nitrogen atoms such as cellulose acetate, polyethylene terephthalate, polycarbonates, polypropylene and the like. There is described in more detail in "Chemical Handbook, Application Part, Chapter 10, High Molecular Chemical Industry", 1980, edited by the Chemical Society fo Japan (published by Maruzen) (written in Japanese). Appropriate materials can be chosen from among the materials described therein. A light-absorbing material such as carbon black and organic dye, or a light-absorbing material such as titanium dioxide may be incorporated into a plastic sheet made of the above-described material. Alternatively, the substrate itself may be made light-absorptive or light-reflective.

Figure 13A:
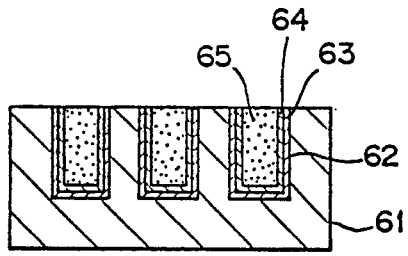
Figure 13B:
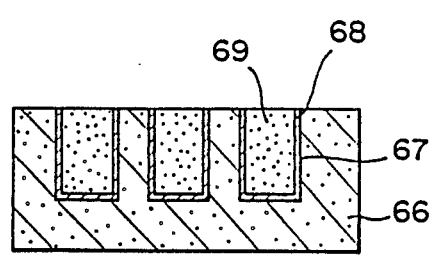

The light-absorbing material may be used together with the light reflecting material and provided on the inner surface of the microcell as shown in FIG. 13(a). Alternatively, the light-absorbing material is uniformly dispersed in the support and the light-reflecting material is provided on the inner surface of the microcell as shown in FIG. 13(b). In FIG. 13(a), numeral 61 is support, 62 is microcell, 63 is light-absorbing layer, 64 is light-reflecting layer and 65 is stimulable phosphor. In FIG. 13(b), numeral 66 is support containing a light-absorbing material dispersed therein, 67 is microcell, 68 is light reflecting layer and 69 is stimulable phosphor. The light-absorbing material has an effect of preventing a light from leaking from one cell to other cell due to a defect of failure in the function of the light-reflecting layer. The light-reflecting material has an effect of much more confining stimulating rays within each micro-cell, to improve the sensitivity of the radiation image storage panel and the quality of an image provided thereby.

Other examples of the substrate material include light metals such as Mg, Al and Ti; and ceramics and glasses mainly composed of $SiO_2$, $Al_2O_3$ and aluminum silicate. These materials have a low X-ray absorptivity and a low coefficient of linear expansion as well as excellent light reflection characteristics so that when the recessed parts are formed, the inner surfaces thereof can be made light-reflective. Further, appropriate materials can be chosen from among those described in the aforementioned literature "Chemical Handbook, Chapter 6, Ceramics" (written in Japanese).

The support may be prepared from a composite material composed of these materials. For instance, the support may be one wherein a light-reflecting layer comprising a light-reflecting material such as titanium dioxide or a light-absorbing layer comprising a light-absorbing material such as carbon black is provided on the surface of a substrate composed of an organic high-molecular material. In one embodiment, a light-reflecting layer comprising titanium dioxide is provided on the surface of polyethylene terephthalate and the light-reflecting layer is recessed, whereby the light-reflecting layer can be naturally provided on the inner surfaces of the recessed parts.

Particularly, in order to effectively prevent the stimulating rays from being spread in the cross direction, it is preferred to provide a light-absorbing layer colored with an organic dye which selectively absorbs the stimulating rays as shown in FIG. 13(a) or 13(b). A light-absorbing layer containing carbon black is preferred, because it has an antistatic property.

Accordingly, support composed of a substrate alone as well as supports composed of a substrate and various layers such as a light-reflecting layer and a light-absorbing layer provided thereon are included within the scope of the present invention.

A lot of fine recessed parts (microcells) indispensable for the structure of the invention are regularly provided on the one side of the support.

As the shape of the opening of the microcell, there may be any of a triangle to a decagon, a circle, an ellipse and the like. As the cross sectional shape of the microcell, there may be any of a rectangle, a trapezoid and a semi-ellipse.

It is preferred that the ratio ($d_1$:h) of bore $d_1$ to depth h of the opening of the microcell is not less than 1:3.5 from the viewpoints of sensitivity and image quality such as sharpness. When the depth of the microcell is larger than the bore of the opening thereof, the spreading of stimulating rays entered into the panel can be adjusted to approximately the bore of the opening and at the same time, the amount of the light emitted by the stimulable phosphor can be increased. The ratio of $d_1$:h is more preferably is in the range of 1:5 to 1:30. The term "bore" of the opening of the cell (or hole) means diameter when the opening is in the form of a circle, and means the maximum linear distance of a polygon when the opening is in the form of a polygon. The term "depth" of the cell (or the length of the hole) means the maximum distance in the direction perpendicular to the surface of the support (or substrate).

Generally, the bore of the opening of the microcell is in the range of 1 to 200 $\mu$m, and the depth of the cell is in the range of 3.5 $\mu$m to 1 mm. Preferably, $d_1$ is in the range of 1 to 50 $\mu$m, and h is in the range of 5 to 300 $\mu$m.

Figure 8A:
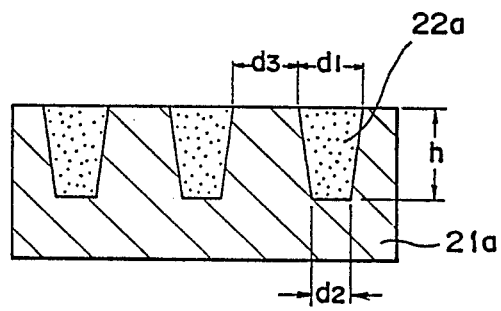
FIGS. 8 and 10 to 13 are cross-sectional views showing embodiments of the support of the radiation image storage panel of the invention.
Figure 8B:
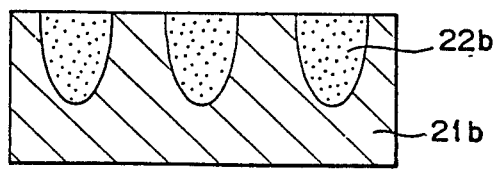

In order to allow the light emitted by the stimulable phosphor in the microcells to be efficiently radiated outwards, it is desirable that the microcells 22a provided on the support is in the form of an ellipse where the bore $d_1$ at the top of the opening is larger than the bore $d_2$ at the bottom as shown in FIG. 8(a), or the microcells 22b (21b: support) are in the form of a semi-ellipse as shown in FIG. 8(b). When the cross sectional shape of the cell is in the form of a trapezoid, the ratio ($d_1$:$d_2$) of the top bore $d_1$ to the bottom bore $d_2$ is generally in the range of 11:10 to 4:1, preferably 6:5 to 2:1.

Figure 9A:
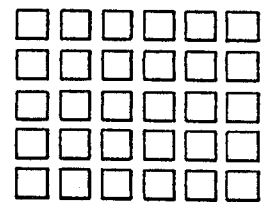
FIGS. 9(a) and 9(b) are plane views showing embodiments of the support of the radiation image storage panel of the invention.
Figure 9B:
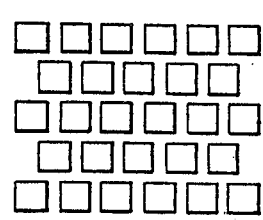

In the present invention, the microcells are regularly provided on the surface of the support. For instance, the microcells may be arranged as shown in FIG. 9(a), or there may be used an arrangement wherein the microcells are shifted by the half size of the cell on every other line (so-called pixel shifting) as shown in FIG. 9(b). Generally, the distance $d_3$ between the cells is in the range of 0.5 to 200 $\mu$m, and the total of the areas of the openings of the cells is in the range of 50 to 90%, preferably 70 to 90% of the surface area of the support. The microcells can be formed on the surface of the support, for instance, by utilizing lithography such as dry etching having directionality. An example thereof include reactive ion etching (RIE) with $O_2$ gas, $CCl_4$ gas or the like.

In an embodiment, a metal such as Al is deposited on the surface of a support made of a plastic sheet, the patterning of a metallic film is conducted by photolithography or wet etching, the patterned metallic film is allowed to be a mask, and the reactive ion etching is carried out with $O_2$ gas. When the support is made of an organic high-molecular material, the etching ratio of Al to organic material is about 1/1000 (Al/organic material), and only the support can be substantially etched. Further, since the etching rate of the organic high-molecular material is accelerated with rise in the temperature of said material, it is desirable that the support is heated to 80° to 200° C. and then etching is conducted. For example, when the support is heated to 100° to 150° C., the etching rate is generally 0.7 μm/min. and it takes about 200 minutes to perform the etching of 140 μm in depth. As the reactive gas, $O_2$ gas containing a small amount of $CF_4$ (particularly, $O_2$ gas containing $10^{-2}$ to 20 mole % of $CF_4$) is preferred, because trace amounts of metals contained in said material can be removed by $CF_4$ gas plasma and Al mask is hardly etched thereby.

The above-described reactive ion etching has been conventionally applied to fine processing such as the processing of electric circuits. However, said reactive ion etching has not been applied to the preparation of an image recording medium as in the present invention as yet. The invention enables the microcells which have a small bore, but are deep, to be formed, though such microcells could not be formed by known methods. Further, the reactive ion etching can be suitably used in the invention without having such a fear of its function being broken by etching as in the etching of electric circuits.

Similarly, supports made of other materials can be subjected to said reactive ion etching. The masking materials can be chosen, for example, by referring to the literature "Semiconductor Plasma Process Technique" (1980) edited by T. Kusano, published by Sangyo Tosho K. K. (written in Japanese). For example, a support made of Al is etched by using $SiO_2$ as the mask and $CCl_4$ gas as the reactive gas.

The microcells having a cross sectional shape in the form of a trapezoid can be formed in the following manner. Low voltage is applied during directional dry etching to thereby reduce the acceleration of ion in a given direction or increase gas pressure and the scattering probability of ions accelerated in a given direction due to collision with other gas molecules is increased, whereby the side of the cell can be sloped. Alternatively, discharge separation type directional dry etching may be utilized. In this case, there are separately provided electrodes for forming plasma ions by discharge and electrodes for forming an electric field giving a directionality to ions and hence, this type is preferable in respect of that the concentration of plasma ion species and the intensity of an electric field for accelerating ions in a given direction can be arbitrarily changed and the range to be chosen is increased. As the discharge separation type, there are one wherein a plasma generation part and a directional ion etching part are positionally separated from each other, and one wherein both are provided at the same position and a pair of electrodes for the directional ion etching part is provided at a right angle to a pair of electrodes for the plasma generation part. From the viewpoint of separability, the former wherein both are positionally separated is preferred. The control of the directionality of the etching can be effected by altering voltage to be applied to parallel flat electrodes or changing a ratio of applied time to non-applied time (that is, duty ratio).

The above-described methods can be carried out by referring to the literatures, "Semiconductor Study 14, Super LSI Technique Fine Processing", edited by Semiconductor Research Organization (published by Kogyo Chosakai Publishing Co., Ltd.) (written in Japanese) and "Semiconductor Handbook, the second edition, Chapters 10 and 11", edited by H. Yanai (published by The OHM-sha, Ltd.) (written in Japanese).

Figure 10:
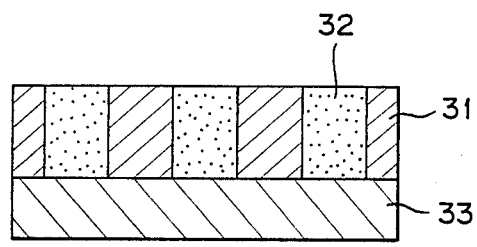

The microcells may be provided by forming holes 32 through a substrate 31 as shown in FIG. 10. The formed holes are charged with a stimulable phosphor, and a layer 33 such as a light-reflecting layer is then provided on one side of the substrate to form the bottom of the cell. Accordingly, the cell is formed by the substrate 31 and the layer 33 as the wall surfaces, and the support is composed of the substrate 31 and the layer 33. Such structure is also included within the scope of the present invention. In the preparation of a type having such a structure, the depths of the cells can be made uniform and air or the like in the cells are discharged from other opened ends so that the cells can be charged easily and quickly with the stimulable phosphor particles without interference of air.

Further, a solvent in a dispersion containing a stimulable phosphor and a binder can be evaporated through both opened ends and hence, drying proceeds well after the charging of the phosphor. There is further an advantage that such preparation is free from the problems of that unevenness in the etching depth is caused by local abnormal discharge or local rise in the etching rate due to the channeling phenomenon of a material to be etched.

Figure 11:
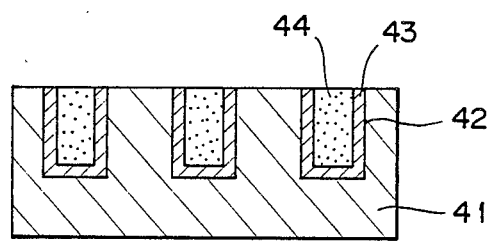

It is preferred to provide a light-reflecting layer on the inner surface of the microcell from the viewpoints of improvements in image quality and sensitivity, and it is preferred to provide a light-absorbing layer from the viewpoint of the image quality such as sharpness as shown in FIG. 11 (41: substrate, 42: microcell, 43: light reflecting layer or light-absorbing layer, 44: stimulable phosphor). As the material for the light-reflecting layer, there are used materials having high reflectivity to stimulating rays for exciting the phosphor and stimulated emission (light in the visible to infrared region). Examples of such materials include metals such as Ag, Al, Au, Rh, Cu and Ti and alloys and silicides thereof; white and color pigments such as $TiO_2$ (rutile and anatase types), zinc sulfide, barium sulfate, diamond powder and MgO; and magnesia powder. Among them, there are preferred materials which hardly absorb X-rays, from the viewpoint of sensitivity. Diamond powder, $TiO_2$, Ti and Al having a low atomic number are preferred.

As the material for the light-absorbing layer, there are preferred materials having high absorptivity to stimulating rays and low absorptivity to stimulated emission. Examples of such materials include carbon black and pigments and organic dyes, which selectively absorb light in the wavelength region of the stimulating rays, disclosed in U.S. Pat. No. 4,394,581 and U.S. patent application No. 326,642. It is preferred that the light-absorbing layer is provided on the side surface of the microcell to thereby prevent stimulated emission from being spread in the crosswise direction.

The light-reflecting layer and the light-absorbing layer can be provided on the inner surface of the microcell by any of the following methods. A coating dispersion may be applied to the surface of the inner wall of the recessed part by a conventional coating method. As described above, a light-reflecting layer or a light-absorbing layer having a uniform thickness is provided on the support and said layer may be regularly recessed. When there are provided holes through a substrate constituting the support, the surface of the substrate is coated with a dispersion of a light-reflecting material or a light-abosrbing material, one side of the substrate is brought into vacuum and said dispersion is allowed to pass through the holes, whereby the light reflecting layer or the light-absorbing layer can be provided. In carrying out metalizing, gaseous Al (e.g. Al atom or Al molecule vaporized by resistance heating) is forcedly passed through the holes, whereby an Al film can be easily formed, though conventional methods have much difficulty in forming such a film on the surface of the inner surface of such a hole. This method can be carried out by referring to a method using a millipore filter for semiconductor gas line.

The charging of the stimulable phosphor into the microcell can be carried out, for example, in the following manner.

The dispersion in which stimulable phosphor particles are uniformly dispersed in a binder solution, as described above. Each microcell is charged with the dispersion by applying the dispersion to the support, and the support is then dried. A photo-crosslinkable polymer may be used as a binder, and the dispersion is irradiated with light to cure the binder. The use of a two-pack system such as Araldite is preferable to a method using solvents in respect of that the drying operation of the solvent can be reduced.

The stimulable phosphor particles may be directly charged into the microcells, or they may be charged by a deposition method.

When the holes through the substrate are formed, the charging of the phosphor can be made easily and rapidly by bringing one side of the substrate into reduced pressure state (e.g. pressure of top surface/pressure of under surface being $1.0-10^4$).

Figure 12:
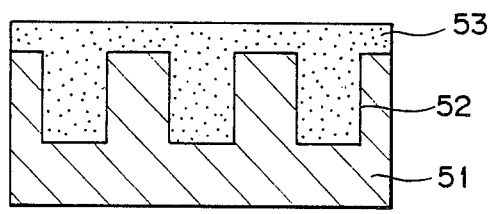

If desired, further a phosphor layer of 1 to 50 μm in thickness may be provided on the support as shown in FIG. 12 (51: substrate, 52: microcell, 53: phosphor layer). This structure has an effect of eliminating the graininess of image and hence, an image of high quality can be obtained in addition to the above-described effects.

The stimulable phosphor is locally placed in plural recessed parts (microcells), unlike the phosphor layer. Thus, although the stimulating rays entered into the microcells are scattered or reflected within the cells, the rays excite the phosphor in said microcells without causing further spreading, and the excited phosphor in each cell emits light. That is, the stimulating rays in the panel are prevented from being spread in the cross direction, whereby lowering of sharpness due to that the phosphor is excited by the scatted stimulating rays is prevented and an image of good quality can be obtained.

The surface of the phosphor layer not facing the support (or the surface of the support having the microcells charged with the stimulable phosphor) is provided with a multi-layer optical filter [filter (1)], which is a characteristic requisite of the present invention.

The multi-layer optical filter (1) in the invention has a transmittance of not less than 70% with respect to stimulating rays for exciting the stimulable phosphor contained in the phosphor layer at an incident angle of 0°-5° and a reflectance of not less than 60% with respect to the stimulating rays at an incident angle of not smaller than 30°. Preferably, the multi-layer optical filter has a transmittance of not less than 80% for the stimulating rays at an incident angle of 0°-5° and a reflectance of not less than 70% for the stimulating rays at an incident angle of not smaller than 30°. That is, the optical filter is required to have said transmittance and reflectance depending upon the angle of incidence for at least one wavelength within the region of the stimulation wavelength for the stimulable phosphor, preferably at the wavelength in the vicinity of peak of the stimulation spectrum of the phosphor.

The multi-layer optical filter mainly includes one transmissive for the light (stimulated emission) emitted by the stimulable phosphor and one reflective therefor. When the multi-layer optical filter is transmissive one, the transmittance thereof is preferably not less than 60% and more preferably not less than 80%. When the multi-layer optical filter is reflective one, the reflectance thereof is preferably not less than 60% and more preferably not less than 80%. The optical filter has such transmittance or reflectance angle-independently for at least one wavelength within the wavelength region of the stimulated emission of the stimulable phosphor, preferably at the wavelength in the vicinity of peak of the emission spectrum of the phosphor.

For instance, a commercially available radiation image storage panel generally employs a divalent europium activated barium fluorohalide phosphor (peak wavelength of the stimulated emission: approx. 390 nm), and a He-Ne laser beam (wavelength: 633 nm) is employed as stimulating rays for exciting the phosphor. Accordingly, when the phosphor layer of the invention contains said stimulable phosphor, the multi-layer optical filter has only to have the above-mentioned angle-dependent trasmittance and reflectance at the stimulation wavelength of 633 nm. The filter preferably has the above-mentioned transmittance or reflectance at the emission wavelength of approx. 390 nm.

The multi-layer optical filter may be a short pass filter having a broad band in the transmission spectrum, or may be a band pass filter having an extremely sharp band therein. Preferably, the multi-layer optical filter transmissive for the emitted light is a band pass filter.

Examples of the transmission and reflection characteristics and the angle-dependence thereof as for the multi-layer optical filter employable in the invention are shown in FIGS. 15 to 20, respectively.

Figure 15:
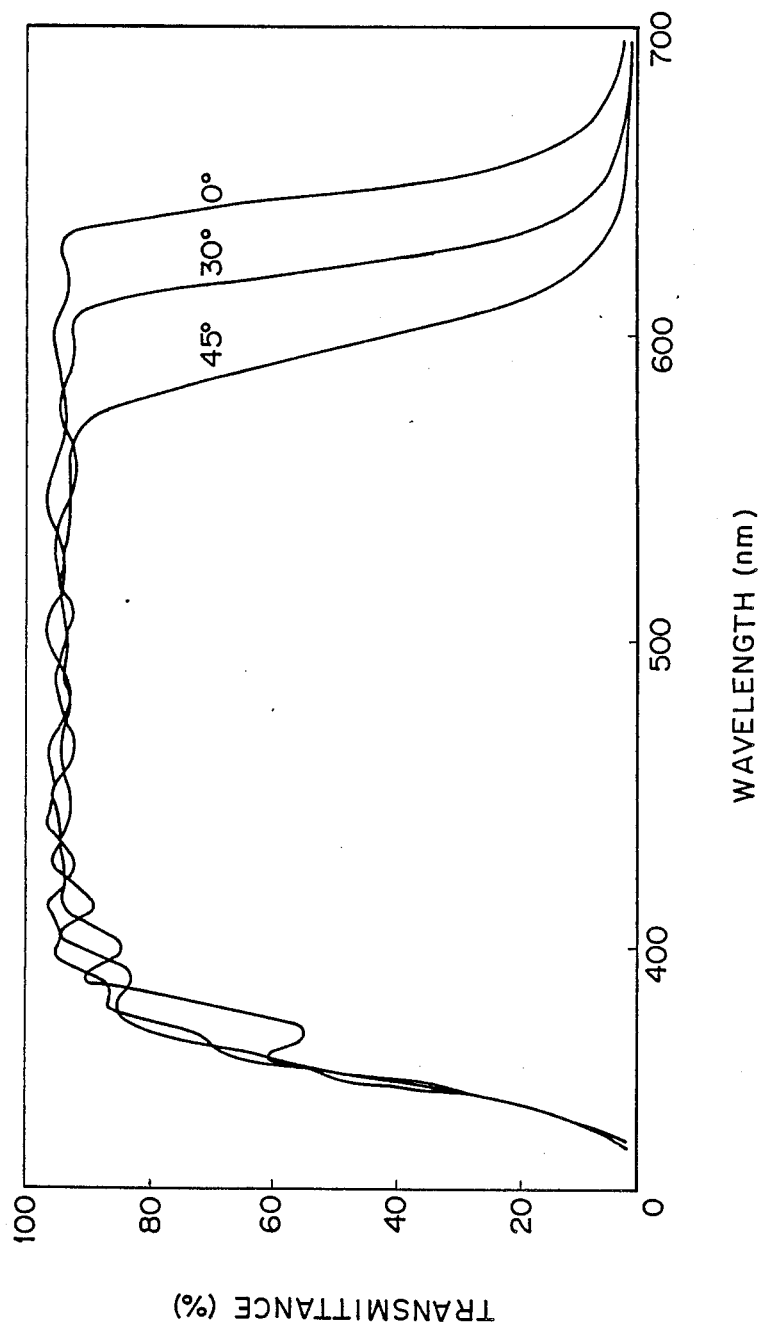
FIG. 15 is a graph showing transmission spectra at incident angles of 0°, 30° and 45°, respectively, with respect to a short pass filter (transmissive for the emitted light) employable in the invention.

FIG. 15 shows transmission spectra at incident angles of 0°, 30° and 45°, respectively, with respect to a short pass filter transmissive at the emission wavelength.

Figure 16:
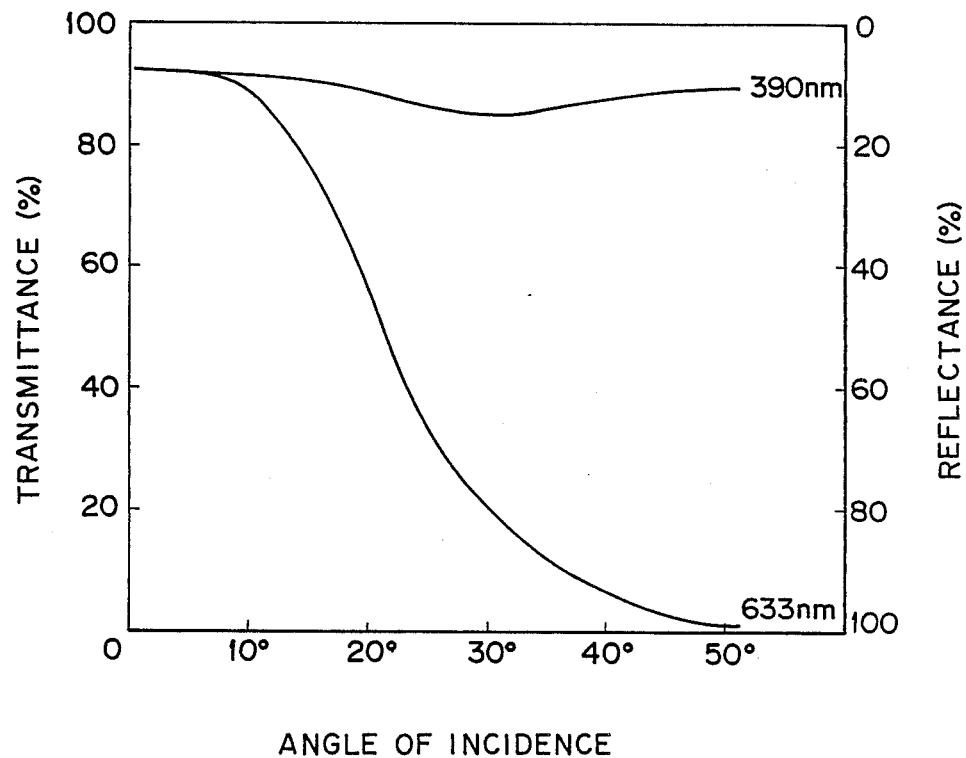
FIG. 16 is a graph showing angle-dependence of the transmittance and the reflectance with respect to said short pass filter.

FIG. 16 is a graph showing relationships between the incident angle and the transmittance and relationships between the incident angle and the reflectance at wavelength of 390 nm and 633 nm, with respect to said short pass filter.

Figure 17:
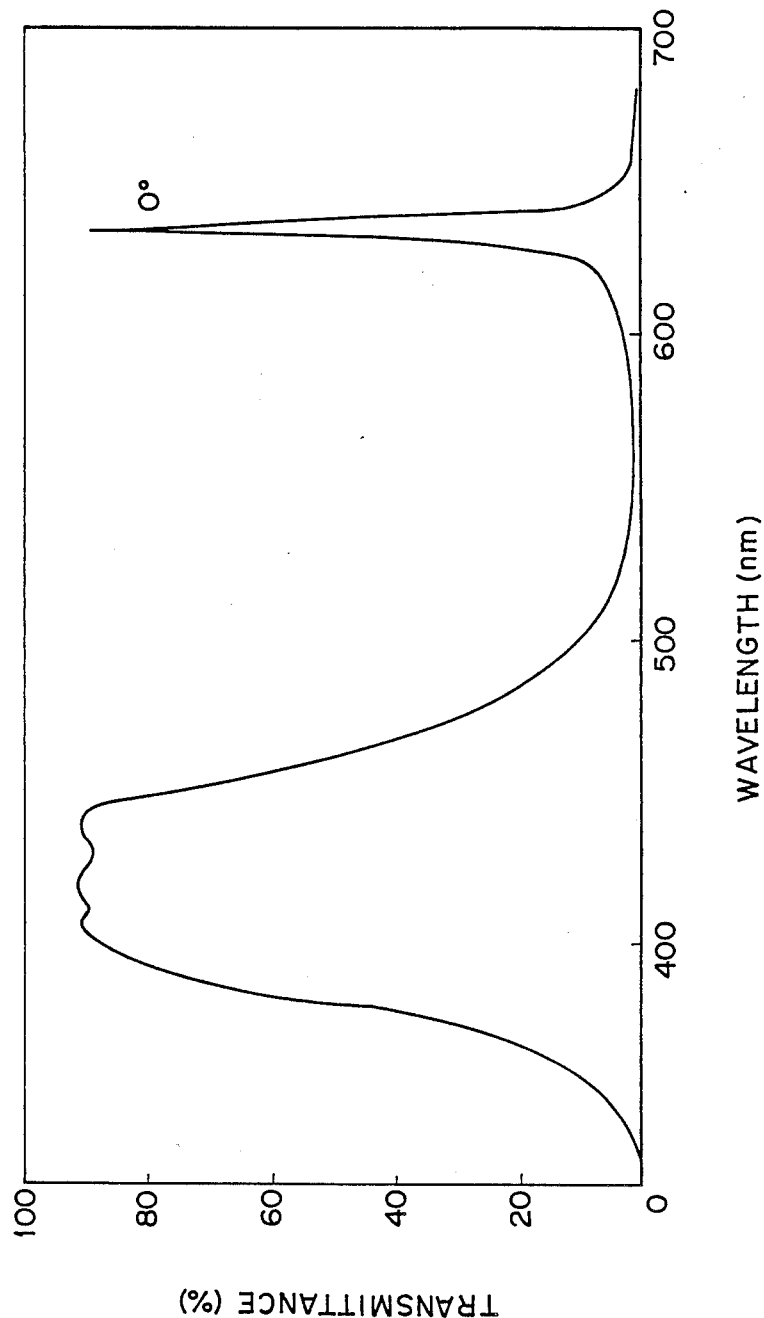
FIG. 17 is a graph showing a transmission spectrum at an incident angle 0° with respect to a band pass filter (transmissive for the emitted light) employable in the invention.

FIG. 17 shows transmission spectra at an incident angle of 0° with respect to a band pass filter transmissive at the emission wavelength.

Figure 18:
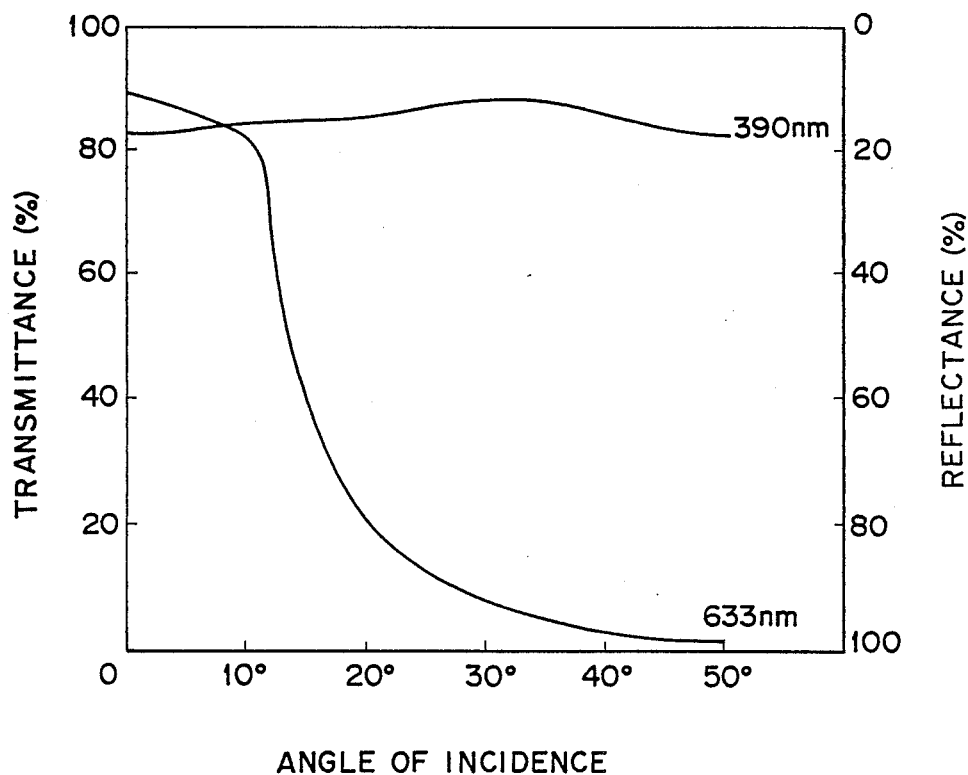
FIG. 18 is a graph showing angle-dependence of the transmittance and the reflectance with respect to said band pass filter.

FIG. 18 is a graph showing relationships between the incident angle and the transmittance and relationships between the incident angle and the reflectance at wavelength of 390 nm and 633 nm with respect to said band pass filter.

Figure 19:
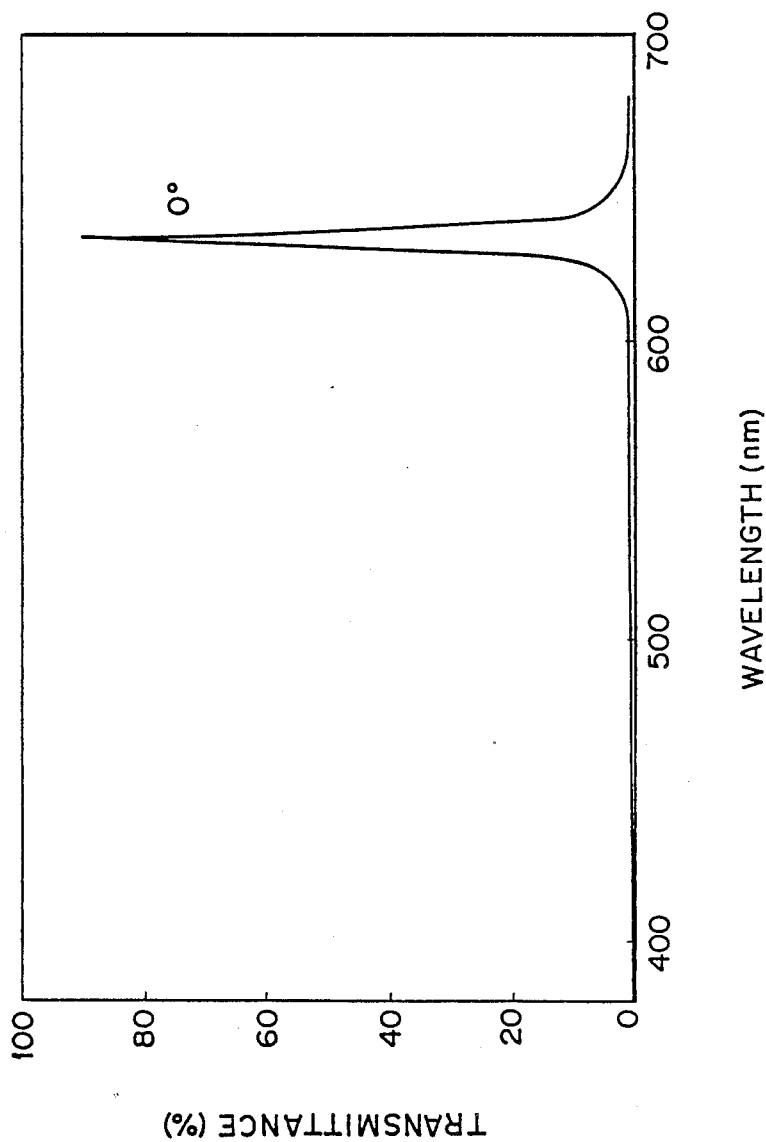
FIG. 19 is a graph showing a transmission spectrum at an incident angle 0° with respect to a band pass filter (reflective for the emitted light) employable in the invention.

FIG. 19 shows transmission spectra at an incident angle of 0° with respect to a band pass filter reflective at the emission wavelength.

Figure 20:
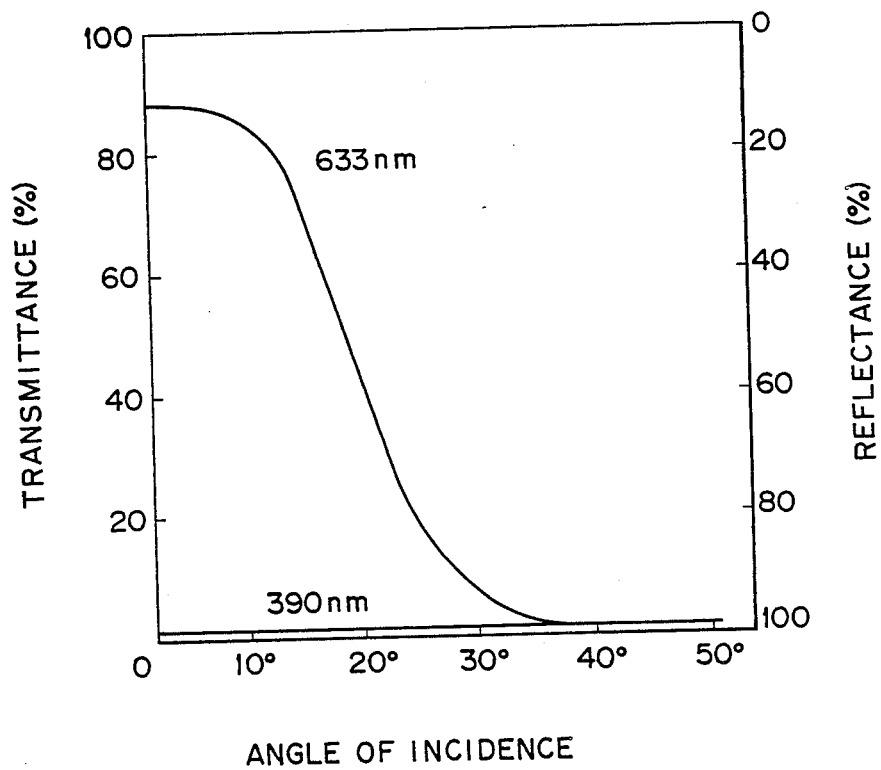
FIG. 20 is a graph showing angle-dependence of the transmittance and the reflectance with respect to said band pass filter.

FIG. 20 is a graph showing relationships between the incident angle and the transmittance and relationships between the incident angle and the reflectance at wavelength of 390 nm and 633 nm, with respect to said band pass filter.

In FIGS. 16, 18 and 20, 633 nm corresponds to stimulation wavelength of the above-mentioned divalent europium activated barium fluorohalide phosphor, and 390 nm corresponds to the peak wavelength of stimulated emission thereof.

The multi-layer optical filter is prepared by successively laminating two or more materials having different refractive index in the thickness of approx. ¼ of the wavelength of light. Materials for the multi-layer optical filter can be selected from those conventionally employed for the known optical thin films. Examples of the materials include materials having a low refractive index such as $SiO_2$ and $MgF_2$ and materials having a high refractive index such as $TiO_2$, $ZrO_2$ and ZnS.

The multi-layer optical filter can be prepared, for example, by laminating thin films of the above-mentioned materials in the form of several to several tens layers on a transparent sheet (sheet for protective film) through vacuum deposition, spattering, ion-plating, etc. Especially, the ion-plating method is preferred, since a filter having a high adhesion with the sheet can be prepared without rising the temperature of the sheet even when the sheet is made of polymer material.

In the preparation of the multi-layer optical filter, the employed materials (refractive index) and the thickness of each layer are controlled to obtain various optical filters having the aforementioned characteristics suitable for the stimulable phosphor to be employed. The whole thickness of the multi-layer optical filter is in the range of approx. 0.1 to 10 $\mu$m.

The multi-layer optical filter can be laminated on either or both sides of the transparent sheet. Examples of the transparent sheet include plastic sheets made of polyethylene terephthalate, polyethylene, polyvinylidene chloride and polyamide; and glasses. The surface of the transparent sheet may be previously subjected to various surface treatments or undercoating treatments in order to clean or smooth the surface thereof.

The multi-layer optical filter made of the above-mentioned materials has a relatively high hardness, and hence the multi-layer optical filter can also serve as a protective film for physically and chemically protecting the phosphor layer.

The multi-layer optical filter is provided on the phosphor layer by combining the transparent sheet provided with the optical filter and the phosphor layer by an adhesive agent.

Alternatively, the multi-layer optical filter may be directly prepared on the phosphor layer by the deposition method, etc. In this case, the phosphor layer is desired to be also prepared by the same deposition method, because the prepared phosphor layer has a surface of high smoothness. Further, the phosphor layer and the multi-layer optical filter can be successively prepared in the same vacuum system by the deposition method, so that the process for the preparation of a radiation image storage panel can be simplified.

On the multi-layer optical filter, a transparent protective film may be provided to protect the phosphor layer physically and chemically. When the multi-layer optical filter together with the transparent sheet is provided on the phosphor layer, the transparent sheet serves as a transparent film.

The protective film can be provided on the multi-layer optical filter by coating the surface of the multi-layer optical filter with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the multi-layer optical filter by beforehand preparing it from a polymer such as polyethylene terephthalate, polyethylene, polyvinylidene chloride or polyamide, followed by placing and fixing it onto the optical filter with an appropriate adhesive agent. The transparent protective film preferably has a thickness within the range of approx. 0.1 to 20 $\mu$m.

Otherwise, the protective film may be provided on the multi-layer optical filter by depsiting inorganic materials such as oxides (e.g. $SiO_2$, $Al_2O_3$), fluorides (e.g. $MgF_2$) and carbides (e.g. SiC) on the surface of the filter. By using glasses, ceramics or coating agents the protective film can be also provided thereon.

The radiation image storage panel of the present invention, in which multi-layer optical filters (1) and (2) are provided on both surfaces of a phosphor layer (see, FIG. 3), can be prepared by using the filter (2) instead of the support.

The multi-layer optical filter (2) in the invention has a reflectance of not less than 60% with respect to stimulating rays for exciting the stimulable phosphor contained in the phosphor layer. Preferably, the multi-layer optical filter has a reflectance of not less than 80% for the stimulating rays. That is, the optical filter is required to have said reflectance for at least one wavelength within the region of the stimulation wavelength for the stimulable phosphor, preferably at the wavelength in the vicinity of peak of the stimulation spectrum of the phosphor.

The mutli-layer optical filter preferably has a transmittance of not less than 60% with respect to the light (stimulated emission) emitted by the stimulable phosphor and more preferably not less than 80%. The optical filter has such transmittance angle-independently for at least one wavelength within the wavelength region of the stimulated emission of the stimulable phosphor, preferably at the wavelength in the vicinity of peak of the emission spectrum of the phosphor.

When the phosphor layer contains the above-mentioned divalent europium activated barium fluoroharide phosphor, the multi-layer optical filter has only to have said angle-dependent reflectance at the stimulation wavelength of 633 nm. The optical filter preferably has said transmittance at the emission wavelength of approx. 390 nm.

A representative multi-layer optical filter having said reflection characteristics and further the transmission characteristics is a dichroic filter.

Figure 21:
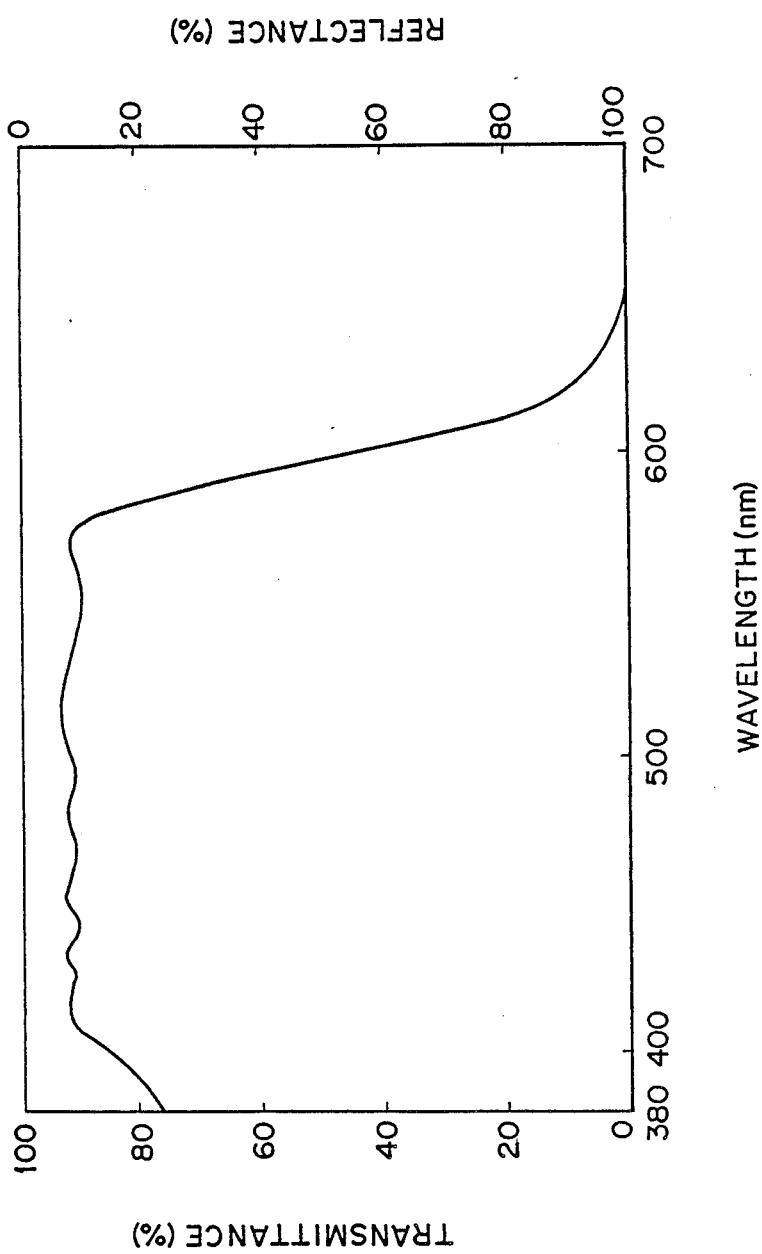
FIG. 21 is a graph showing a transmission and reflection spectrum with respect to a dichroic filter employable in the invention.

Examples of the reflection and transmission characteristics of the multi-layer optical filter employable in the invention are shown in FIG. 21.

FIG. 21 shows transmission and reflection spectra with respect to a dichroic filter, which is transmissive at the emission wavelength of the stimulable phosphor.

The multi-layer optical filter (2) such as a dichroic filter can be prepared by the same method using the same materials as that of the multi-layer optical filter (1).

A support is not always necessary in the radiation image storage panel provided with the multi-layer optical filter (2), since the filter (2) is usually prepared on a substrate such as a glass plate. If desired, a transparent support such as a plastic sheet which is employed in the known panel may be provided on one surface of the filter (2) (surface not facing the phosphor layer) by using an adhesive agent.

On the transparent substrate provided with the multi-layer optical filter (2), a phosphor layer, a multi-layer optical filter (1), and further a protective film are provided in the same manner as described above.

Further, the radiation image storage panel of the present invention may be colored with a colorant to enhance the sharpness of the image provided thereby. At least one part of the panel is colored, for example, one of the support, the subing layer, the light-reflecting layer, the phosphor layer, the adhesive layer and the protective film. The phosphor layer is preferably colored.

The colorant employable in the invention is required to absorb at least a portion of the stimulating rays. The colorant preferably has such absorption characteristics that the mean absorbance thereof in the region of the stimulation wavelength for the stimulable phosphor employed in the panel is higher than the mean absorbance thereof in the region of the emission (stimulated emission) wavelength of the stimulable phosphor. From the viewpoint of the sharpness of the resultant image, it is desired that the mean absorbance of the colorant in the region of the stimulation wavelength is as high as possible. On the other hand, from the viewpoint of the sensitivity of the panel, it is desired that the mean absorbance of the colorant in the region of the emission wavelength is as low as possible.

Accordingly, the preferred colorant depends on the stimulable phosphor employed in the radiation image storage panel. From the viewpoint of practical use, the stimulable phosphor is desired to give stimulated emission in the wavelength region of 300–500 nm when excited with stimulating rays in the wavelength region of 400–900 nm as afore-described. Employable for such a stimulable phosphor is a colorant having a body color ranging from blue to green, so that the mean absorbance thereof in the region of the stimulation wavelength for the phosphor is higher than the mean absorbance thereof in the region of the emission wavelength of the phosphor and the difference therebetween is as large as possible.

Examples of the colorant employed in the invention include the colorants disclosed in the above-mentioned U.S. Pat. No. 4,394,581, that is: organic colorants suuch as Zapon Fast Blue 3G (available from Hoechst AG), Estrol Brill Blue N-3RL (available from Sumitomo Chemical Co., Ltd.), Sumiacryl Blue F-GSL (available from Sumitomo Chemical Co., Ltd.), D & C Blue No. 1 (available from National Aniline), Spirit Blue (available from Hodogaya Chemical Co., Ltd.), Oil Blue No. 603 (available from Orient Co., Ltd.), Kiton Blue A (available from Ciba-Geigy), Aizen Cathilon Blue GLH (available from Hodogaya Chemical Co., Ltd.), Lake Blue A.F.H. (available from Kyowa Sangyo Co., Ltd.), Rodalin Blue 6GX (available from Kyowa Sangyo Co., Ltd.), Primocyanine 6GX (available from Inahata Sangyo Co., Ltd.), Brillacid Green 6BH (available from Hodogaya Chemical Co., Ltd.), Cyanine blue BNRS (available from Toyo Ink Mfg. Co., Ltd.), Lionol Blue SL (available from Toyo Ink Mfg. Co., Ltd.), and the like; and inorganic colorants such as ultramarine blue, cobalt blue, ceruleanblue, chromium oxide, $TiO_2$-$ZnO$-$CoO$-$NiO$ pigment, and the like.

Examples of the colorant employable in the present invention also include the colorants described in the above-mentioned U.S. patent application No. 326,642, that is: organic metal complex salt colorants having color Index No. 24411, No. 23160, No. 74180, No. 74200, No. 22800, No. 23150, No. 23155, No. 24401, No. 14880, No. 15050, No. 15706, No. 15707, No. 17941, No. 74220, No. 13425, No. 13361, No. 13420, No. 11836, No. 74140, No. 74380, No. 74350, No. 74460, and the like.

Among the above-mentioned colorants having a body color from blue to green, particularly preferred are the organic metal complex salt colorants which show no emission in the longer wavelength region than that of the stimulating rays as described in the latter U.S. patent application No. 326,642.

When the phosphor layer is colored with the colorant, the colorant is added to the coating dispersion for the preparation of the phosphor layer. The ratio between the binder and the colorant in the coating dispersion is within the range of from 10:1 to $10^6$:1 (binder:-colorant, by weight) in the case of a dye colorant. The ratio between the binder and the colorant is within the range of from 1:10 to $10^5$:1, by weight in the case of a pigment colorant. In the case of the pigment colorant, one selected from publically known noionic surfactants may be further added to the coating dispersion as a dispersing agent.

When the support is colored, either or both of surfaces of the support may be colored and otherwise, the whole of the support may be colored. The phosphor layer-side surface of the support is colored, when the support being made of a material non-transmissive for the stimulating rays. To color one or both surfaces of the support, a coating solution (or dispersion) containing the colorant and a binder is prepared and then applied thereonto. To color the whole of the support, the colorant is dispersed in the support during the preparation of the support.

When the light-reflecting layer is colored, the colorant is added together with particles of the light-reflecting material to the coating dispersion for the preparation of the light-reflecting layer.

When the protective film is colored, either or both of surfaces of the protective film may be colored and otherwise, the whole of the protective film may be colored. The protective film is colored by coating the surface of the protective film with a coating solution (or dispersion) containing the colorant or by dispersing the colorant in the protective film during the perparation thereof.

The radiation image storage panel of the invention may contain a white powder in the phosphor layer as described in U.S. Pat. No. 4,350,893, to enhance the sharpness of the resulting image.

The following examples further illustrate the present invention, but these examples are understood to by no means restrict the invention.

EXAMPLE 1

A transparent grass plate (sheet for protective film, thickness: approx. 1 mm) heated to about 350° C. was placed in a vacuum container, and $TiO_2$ and $SiO_2$ were vacuum-deposited thereon alternately and repeatedly while controlling the thickness of each of layers to be deposited, whereby a multi-layer optical filter (short pass filter) having the total thickness of approx. 2 $\mu$m (about 20 laminated layers) and having transmission and reflection characteristics as shown in FIG. 16 was formed on the glass plate.

To a mixture of a divalent europium activated alkaline earth metal fluorobromide ($BaFBr:Eu^{2+}$) phosphor particles and a linear polyester resin were added successively methyl ethyl ketone and nitrocellulose (nitration degree: 11.5%), to prepare a dispersion containing the phosphor particles and the binder in the ratio of 10:1 (phosphor:binder, by weight). Tricresyl phosphate, n-buthanol and methyl ethyl ketone were added to the dispersion and the mixture was sufficiently stirred by means of a propeller agitater to obtain a homogeneous coating dispersion having a viscosity of 25-35 PS (at 25° C.).

Subsequently, the coating dispersion was applied to the multi-layer optical filter provided on the glass plate placed horizontally. The application of the coating dispersion was carried out using a doctor blade. After the coating was complete, the glass plate having the coating dispersion was placed in an oven and heated at a temperature gradually rising from 25° to 100° C. Thus, a phosphor layer having the thickness of approx. 250 μm was formed on the multi-layer optical filter.

On the phosphor layer was placed a polyethylene terephthalate sheet containing carbon black (support, thickness: 250 μm) to combine the sheet and the phosphor layer using a polyester adhesive agent.

Thus, a radiation image storage panel consisting essentially of a support, a phosphor layer, a multi-layer optical filter and a transparent protective film (glass plate) was prepared (see, FIG. 1).

Further, a variety of radiation image storage panels were prepared, varying the thickness of phosphor layer within the range of 150-350 μm.

EXAMPLE 2

The procedure of Example 1 was repeated except for forming a multi-layer optical filter (band pass filter) of approx. 2 μm thick having the transmission and reflection characteristics as shown in FIG. 18 by vacuum-depositing $TiO_2$ and $SiO_2$ on the glass plate, to prepare radiation image storage panels consisting essentially of a support, a phosphor layer, a multi-layer optical filter and a transparent protective film.

COMPARISON EXAMPLE 1

The procedure of Example 1 was repeated except for not forming a multi-layer optical filter on the glass plate, to prepare radiation image storage panels consisting essentially of a support, a phosphor layer and a protective film.

The radiation image storage panels prepared as above were evaluated on the sensitivity thereof and the sharpness of the image provided thereby according to the following test.

(1) Sensitivity

The radiation image storage panel was exposed to X-rays at a voltage of 80 KVp and subsequently excited with a He-Ne laser beam (wavelength: 633 nm), to measure the sensitivity. The irradiation of X-rays and laser beam and the detection of the light emitted by the stimulable phosphor in the panel were done from the protective film side of the panel.

(2) Sharpness of image

The radiation image storage panel was exposed to X-rays at a voltage of 80 KVp through a CTF chart and subsequently scanned with a He-Ne laser beam to excite the stimulable phosphor particles contained in the panel. The light emitted by the phosphor particles was detected and converted to electric signals by means of a photosensor (a photomultiplier having spectral sensitivity of type S-5). From the electric signals, the radiation image of CTF chart was reproduced by an image reproducing device to obtain a visible image on a display device. The contrast transfer function (CTF) value of the visible image was determined. The sharpness of the image was evaluated with the value (%) at a spatial frequency of 2 cycle/mm.

Figure 22:
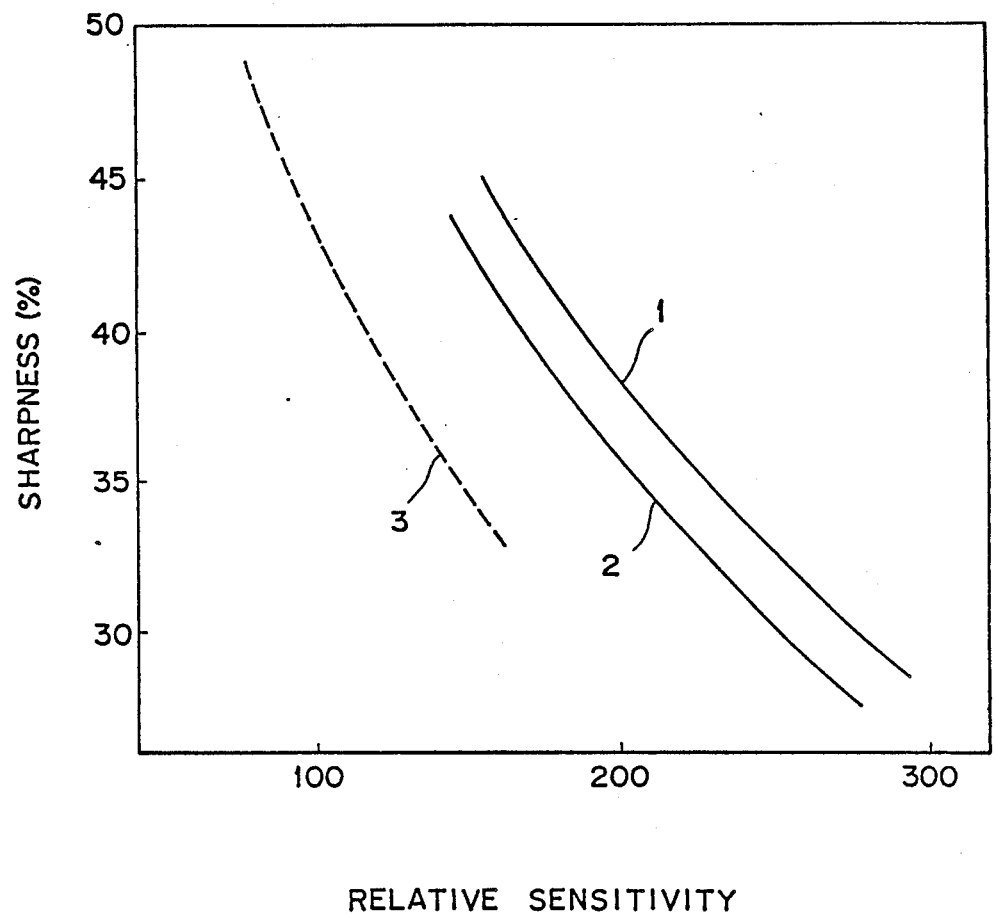
FIG. 22 is a graph showing relationships between the sensitivity and the sharpness with respect to the radiation image storage panels of the invention (solid line) and the known radiation image storage panel (dotted line).

The results are set forth in Table 1 and shown in FIG. 22.

TABLE 1

| | | Thickness of Phophor Layer | Relative Sensitivity |
|---|---|---|---|
| Example | 1 | 250 μm | 240 |
| Example | 2 | 250 μm | 220 |
| Com. Example | 1 | 250 μm | 100 |

FIG. 22 is a graph showing relationships between the relative sensitivity and the sharpness with respect to the radiation image storage panels. In FIG. 22, Curve 1: panels of Example 1,
Curve 2: panels of Example 2, and
Curve 3: panels of Comparison Example 1.

As is evident from the results set forth in Table 1, the radiation image storage panels having a multi-layer optical filter according to the invention (Examples 1 and 2) were remarkably enhanced in the sensitivity, as compared with the known radiation image storage panel having no multi-layer optical filter (Comparison Example 1).

As is evident from FIG. 22, the radiation image storage panels according to the invention (Curves 1 and 2) had higher sensitivity and provided the image of higher sharpness than those of the known radiation image storage panels (Curve 3).

EXAMPLE 3

Aluminum was vacuum-deposited on a transparent glass plate (support, thickness: 1 mm) to form a layer of deposited aluminum having the thickness of approx. 2 μm on the glass plate.

Subsequently, on the layer of deposited aluminum provided on the glass plate was deposited a powdery divalent europium activated barium fluorochloride phosphor ($BaFCl:0.001Eu^{2+}$), to prepare a phosphor layer of deposited phosphor. The deposition of the phosphor was carried out as follows: The phosphor particles were introduced into a molybdenum boat in a vacuum container (vapor pressure: approx. $2 \times 10^{-7}$ Torr) of a vacuum deposition apparatus and then heated. The glass plate (material on which the phosphor was to be deposited) was beforehand subjected to an ultrasonic cleaning treatment on its surface (surface of the layer of deposited aluminum), and then fixed into the apparatus and heated at a temperature of 250° C. by the use of a monochromatic quartz lamp. A phosphor layer having the thickness of 30 μm was formed on the layer of deposited aluminum.

A multi-layer optical filter (short pass filter) was then formed on the phosphor layer by vacuum deposition in the following manner. The glass plate provided with the phosphor layer was heated at a temperature of approx. 350° C. in the vacuum container, and $TiO_2$ and $SiO_2$ were vacuum-deposited on the phosphor layer alternatively and repeatedly with controlling the thickness of each layer, to form a multi-layer (20 layers) filter having the total thickness of approx. 2 μm on the phosphor layer.

The obtained multi-layer optical filter was a short pass filter having such transmission and reflection characteristics as shown in FIG. 16.

Thus, a radiation image storage panel consisting of a support, a layer of deposited aluminum, a phosphor layer and a multi-layer optical filter was prepared.

EXAMPLE 4

The procedure of Example 3 was repeated except for providing a multi-layer optical filter (band pass filter) of approx. 2 μm thick having the transmission and reflection characteristics as shown in FIG. 18 on the phosphor layer by vacuum deposition, to prepare a radiation image storage panel consisting of a support, a layer of deposited aluminum, a phosphor layer and a multi-layer optical filter.

COMPARISON EXAMPLE 2

The procedure of Example 3 was repeated except for not providing a multi-layer optical filter on the phosphor layer, to prepare a radiation image storage panel consisting of a support, a layer of deposited aluminum and a phosphor layer.

The radiation image storage panels prepared as above were evaluated on the sensitivity according to the above-mentioned test. The results are set forth in Table 2.

TABLE 2

|  |  | Relative Sensitivity |
|---|---|---|
| Example | 3 | 200 |
| Example | 4 | 180 |
| Com. Example | 2 | 100 |

As is evident from the results set forth in Table 2, the radiation image storage panels having a multi-layer optical filter according to the invention (Examples 3 and 4) were remarkably enhanced in the sensitivity, as compared with the known radiation image storage panel having no multi-layer optical filter (Comparison Example 2).

EXAMPLE 5

A gelatin dispersion of titanium dioxide ($TiO_2$), which contained a film-curing agent, a surfactant, etc., was applied onto a polyethylene terephthalate sheet (substrate, thickness: 250 μm), and dried to form a light-reflecting layer having the thickness of approx. 170 μm, thus obtaining a support composed of a substrate and a light-reflecting layer.

Al was vacuum-deposited on the light-reflecting layer and further photoresist (AZ 1350, available from Shipley Co.) was spin-coated thereon, exposed to ultra-violet rays and then subjected to a developing treatment with an alkaline solution, whereby the patterning of the resist layer was performed. Etching was carried out for 4 minutes by using a solution of phosphoric acid:nitric acid:acetic acid:water=76:13:15:16, whereby the patterning of the Al film was effected. The Al film was allowed to be a mask, and a lot of microcells having a hexagonal opening and a rectangular cross section (the length of a side of the opening: 10 μm, depth: 160 μm, bore of the opening:depth=1:8, space between cells: 5 μm) were formed in the light-reflecting layer by RIE dry etching method with $O_2+CF_4$ (2 mole %) plasma.

Figure 14:
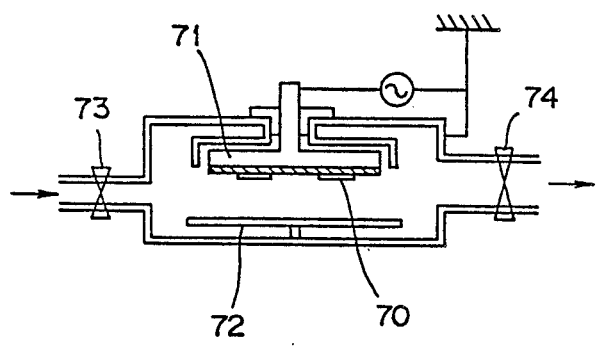
FIG. 14 is a schematic view showing a parallel electrode type plasma generator employed in the preparation of the radiation image storage panel of the invention.

The RIE dry etching was carried out by using a parallel electrode type plasma generator as shown in FIG. 14. The support (sample) 70 provided with the patterned Al film was placed on the cathode 71 of the plasma generator, leak valves 73 and 74 were opened, $O_2+CF_4$ (2 mole %) gas was introduced into the generator in the direction of the arrow, and high-frequency electric power was applied to the cathode 71 and an anode 72. $O^+$ cations generated in plasma was accelerated in the direction of the electrode, went straight ahead and entered perpendicularly the sample 70, whereby the light-reflecting layer on the substrate was truly etched in the shape of the Al mask pattern. Since the etching ratio of Al to gelatin was about 1/1000, the etching could be conducted with perpendicular directionality. In the course of the etching, gelatin was reacted with oxygen to produce carbon dioxide and water. Though aluminum oxide was produced on the surface of the Al film, it was hardly etched.

To a mixture of a particulate divalent europium activated barium fluorobromide ($BaFBr:Eu^{2+}$) phosphor and a linear polyester resin were added successively methyl ethyl ketone and nitrocellulose (nitration degree: 11.5%), and the mixture was thoroughly stirred to prepare a dispersion containing the phosphor particles uniformly, in a mixing ratio of binder to phosphor of 1:20 by weight and a viscosity of 25 to 35 PS (at 25° C.). The dispersion was applied onto the support and dried, whereby each microcell could be charged with the phosphor.

A multi-layer optical filter (short pass filter) having the total thickness of approx. 2 μm (about 20 laminated layers) and having transmission and reflection characteristics as shown in FIG. 16 was formed on the glass plate in the same manner as described in Example 1.

The multi-layer optical filter-side surface of the resulting glass plate was coated with an adhesive agent (thickness: about 2 μm) and bonded to the microcell side of the support.

Thus, a radiation image storage panel consisting essentially of a substrate, a light-reflecting layer having microcells charged with a stimulable phosphor, a multi-layer optical filter and a protective film, was prepared (see, FIG. 6).

EXAMPLE 6

The procedure of Example 5 was repeated except for forming a multi-layer optical filter (band pass filter) of approx. 2 μm thick having the transmission and reflection characteristics as shown in FIG. 18 by vacuum-depositing $TiO_2$ and $SiO_2$ on the glass plate, to prepare a radiation image storage panel consisting essentially of a substrate, a light-reflecting layer having microcells charged with a stimulable phosphor, a multi-layer optical filter and a protective film.

COMPARISON EXAMPLE 3

The procedure of Example 5 was repeated except for not forming a multi-layer optical filter on the glass plate, to prepare a radiation image storage panel consisting essentially of a substrate, a light-reflecting layer having microcells charged with a stimulable phosphor and a protective film.

The radiation image storage panels prepared as above were evaluated on the sensitivity according to the above-mentioned test. The results are set forth in Table 3.

TABLE 3

|  |  | Relative Sensitivity |
|---|---|---|
| Example | 5 | 250 |
| Example | 6 | 230 |
| Com. Example | 3 | 100 |

As is evident from the results set forth in Table 3, the radiation image storage panels having a multi-layer optical filter according to the invention (Examples 5 and 6) were remarkably enhanced in the sensitivity, as compared with the radiation image storage panel having no multi-layer optical filter for comparison (Comparison Example 3).

EXAMPLE 7

A multi-layer optical filter (short pass filter) having the total thickness of approx. 2 μm (about 20 laminated layers) and having transmission and reflection characteristics as shown in FIG. 16 was formed on the glass plate in the same manner as described in Example 1.

Subsequently, a phosphor layer was formed on the multi-layer optical filter in the same manner as described in Example 1.

Independently, aluminum was vacuum-deposited on a polyethylene terephthalate sheet (support, thickness: 180 μm), to form a light-reflecting layer of deposited aluminum having the thickness of 2 μm on a support.

On the phosphor layer was placed the support in such a manner that the light-reflecting layer faced the phosphor layer to combine the support and the phosphor layer using a polyester adhesive agent.

Thus, a radiation image storage panel consisting essentially of a support, a light-reflecting layer, a phosphor layer, a multi-layer optical filter and a transparent protective film (glass plate) was prepared.

EXAMPLE 8

The procedure of Example 7 was repeated except for forming a multi-layer optical filter (band pass filter) of approx. 2 μm thick having the transmission and reflection characteristics as shown in FIG. 18 by vacuum-depositing $TiO_2$ and $SiO_2$ on the glass plate, to prepare a radiation image storage panel consisting essentially of a support, a light-reflecting layer, a phosphor layer, a multi-layer optical filter and a transparent protective film.

COMPARISON EXAMPLE 4

The procedure of Example 7 was repeated except for not forming a multi-layer optical filter on the glass plate, to prepare a radiation image storage panel consisting essentially of a support, a light-reflecting layer, a phosphor layer and a transparent protective film.

The radiation image storage panels prepared as above were evaluated on the sensitivity according to the above-mentioned test. The results are set forth in Table 4.

TABLE 4

|  | | Relative Sensitivity |
|---|---|---|
| Example | 7 | 240 |
| Example | 8 | 220 |
| Com. Example | 4 | 100 |

As is evident from the results set forth in Table 4, the radiation image storage panels having a multi-layer optical filter according to the invention (Examples 7 and 8) were remarkably enhanced in the sensitivity, as compared with the known radiation image storage panel having no multi-layer optical filter (Comparison Example 4).

EXAMPLE 9

A multi-layer optical filter (short pass filter) having the total thickness of approx. 2 μm (about 20 laminated layers) and having transmission and reflection characteristics as shown in FIG. 16 was formed on the glass plate in the same manner as described in Example 1.

Subsequently, a phosphor layer colored blue is formed on the multi-layer optical filter in the same manner as described in Example 1 except for using a coating dispersion to which a blue pigment (No. 8800, available from Daiichi Kasei Co., Ltd.) was added in the ratio of 10 mg of the pigment to 100 g of the phosphor.

On the colored phosphor layer was placed a polyethylene terephthalate sheet containing carbon black (support, thickness: 250 μm) to combine the sheet and the phosphor layer using a polyester adhesive agent.

Thus, a radiation image storage panel consisting essentially of a support, a colored phosphor layer, a multi-layer optical filter and a transparent protective film (glass plate) was prepared).

EXAMPLE 10

The procedure of Example 9 was repeated except for forming a multi-layer optical filter (band pass filter) of approx. 2 μm thick having the transmission and reflection characteristics as shown in FIG. 18 by vacuum-depositing $TiO_2$ and $SiO_2$ on the glass plate, to prepare a radiation image storage panel consisting essentially of a support, a colored phosphor layer, a multi-layer optical filter and a transparent protective film.

COMPARISON EXAMPLE 5

The procedure of Example 9 was repeated except for not forming a multi-layer optical filter on the glass plate, to prepare a radiation image storage panel consisting essentially of a support, a colored phosphor layer and a transparent protective film.

The radiation image storage panels prepared as above were evaluated on the sensitivity according to the above-mentioned test. The results are set forth in Table 5.

TABLE 5

|  | | Relative Sensitivity |
|---|---|---|
| Example | 9 | 220 |
| Example | 10 | 200 |
| Com. Example | 5 | 100 |

As is evident from the results set forth in Table 5, the radiation image storage panels having a multi-layer optical filter according to the invention (Examples 9 and 10) were remarkably enhanced in the sensitivity, as compared with the known radiation image storage panel having no multi-layer optical filter (Comparison Example 5).

EXAMPLE 11

To a mixture of a divalent europium activated alkaline earth metal fluorobromide ($BaFBr:Eu^{2+}$) phosphor particles and a linear polyester resin were added successively methyl ethyl ketone and nitrocellulose (nitration degree: 11.5%), to prepare a dispersion containing the phosphor particles and the binder in the ratio of 10:1 (phosphor:binder, by weight). Tricresyl phosphate, n-butanol and methyl ethyl ketone were added to the dispersion and the mixture was sufficiently stirred by means of a propeller agitater to obtain a homogeneous coating dispersion having a viscosity of 25-35 PS (at 25° C.).

Subsequently, the coating dispersion was applied to a transparent glass plate (support, thickness: approx. 1 mm) placed horizontally. The application of the coating dispersion was carried out using a doctor blade. After the coating was complete, the glass plate having the coating dispersion was placed in an oven and heated at a temperature gradually rising from 25° to 100° C. Thus, a phosphor layer having the thickness of approx. 250 μm was formed on the support.

A transparent grass plate (sheet for protective film, thickness: approx. 1 mm) heated to about 350° C. was placed in a vacuum container, and $TiO_2$ and $SiO_2$ were vacuum-deposited thereon alternately and repeatedly while controlling the thickness of each of layers to be deposited, whereby a multi-layer optical filter (band pass filter) having the total thickness of approx. 2 μm (about 20 laminated layers) and having transmission and reflection characteristics as shown in FIG. 20 was formed on the glass plate.

The multi-layer optical filter-side surface of the resulting glass plate was coated with an adhesive agent (thickness: approx. 2 μm) and bonded to the phosphor layer.

Thus, a radiation image storage panel consisting essentially of a support, a phosphor layer, a multi-layer optical filter (band pass filter) and a transparent protective film (glass plate) was prepared (see, FIG. 2).

EXAMPLE 12

The procedure of Example 11 was repeated except for using a dichroic filter (a multi-layer film provided on a transparent glass plate, trade name: DF-C, available from Hoya Glass Co., Ltd.) having transmission and reflection characteristics as shown in FIG. 21 instead of the support, to prepare a radiation image storage panel consisting essentially of a dichroic filter, a phosphor layer, a band pass filter and a transparent protective film (see, FIG. 3).

COMPARISON EXAMPLE 6

The procedure of Example 11 was repeated except for using a transparent polyethylene telephthalate film (thickness: 12 μm) instead of the band pass filter, to prepare a radiation image storage panel consisting essentially of a support, a phosphor layer and a transparent protective film.

The radiation image storage panels prepared as above were evaluated on the sensitivity according to the above-mentioned test. The irradiation of X-rays and laser beam was done from the protective film-side of the panel and the detection of the light emitted by the stimulable phosphor in the panel was done from the support side thereof. The results are set forth in Table 6.

TABLE 6

|  |  | Relative Sensitivity |
|---|---|---|
| Example | 11 | 180 |
| Example | 12 | 250 |
| Com. Example | 6 | 100 |

As is evident from the results set forth in Table 6, the radiation image storage panel having a multi-layer optical filter (1) on one side of the phosphor layer according to the invention (Example 11), and the radiation image storage panel having multi-layer optical filters (1) and (2) on both sides of the phosphor layer according to the invention (Example 12) were remarkably enhanced in the sensitivity, as compared with the known radiation image storage panel having no multi-layer optical filter (Comparison Example 6).

We claim:

1. A radiation image storage panel comprising a phosphor layer which contains a stimulable phosphor, characterized in that one surface of said phosphor layer is provided with a multi-layer optical filter (1) which has a transmittance of not less than 70% for the light of the stimulation wavelength of said stimulable phosphor and at an incident angle in the range of 0°–5° and has a reflectance of not less than 60% for the light of said stimulation wavelength and at an incident angle of not smaller than 30°, and the other surface of said phosphor layer is provided with a multi-layer optical filter (2) which has a reflectance of not less than 60% for the light of said stimulation wavelength and a transmittance of not less than 60% for the light of the wavelength of the stimulated emission of the stimulable phosphor.

2. The radiation image storage panel as claimed in claim 1, in which said multi-layer optical filter (1) has a transmittance of not less than 80% for the light of the stimulation wavelength of the stimulable phosphor and at an incident angle in the range of 0°–5° and has a reflectance of not less than 70% for the light of said stimulation wavelength and at an incident angle of not smaller than 30°.

3. The radiation image storage panel as claimed in claim 1, in which said multi-layer optical filter (1) has a reflectance of not less than 60% for the light of the wavelength of the stimulated emission of the stimulable phosphor.

4. The radiation image storage panel as claimed in claim 3, in which said multi-layer optical filter (1) has a reflectance of not less than 80% for the light of the wavelength of the stimulated emission of the stimulable phosphor, and said multi-layer optical filter (2) has a transmittance of not less than 80% for the light of said wavelength of the stimulated emission.

5. The radiation image storage panel as claimed in claim 1, in which said multi-layer optical filter (2) is a dichroic filter.

6. The radiation image storage panel as claimed in claim 1, in which said multi-layer optical filters (1) and (2) comprise at least one material of a low refractive index selected from the group consisting of $SiO_2$ and $MgF_2$ and at least one material of a high refractive index selected from the group consisting of $TiO_2$, $ZrO_2$ and ZnS.

7. The radiation image storage panel as claimed in claim 1, in which said multi-layer optical filters (1) and (2) are formed by vacuum deposition.

8. The radiation image storage panel as claimed in claim 1, in which said phosphor layer comprises a binder and a stimulable phosphor dispersed therein.

9. The radiation image storage panel as claimed in claim 1, in which said phosphor layer consists essentially of a stimulable phosphor.

10. The radiation image storage panel as claimed in claim 9, in which said phosphor layer consists essentially of a deposited stimulable phosphor.

11. The radiation image storage panel as claimed in claim 9, in which said phosphor layer consists essentially of a sintered stimulable phosphor.

12. The radiation image storage panel as claimed in claim 1, in which said panel consists essentially of a multi-layer optical filter (2), a phosphor layer, a multi-layer optical filter (1) and a protective film.

13. The radiation image storage panel as claimed in claim 1, in which the stimulation wavelength of said stimulable phosphor is in the range of 400–900 nm.

14. The radiation image storage panel as claimed in claim 13, in which said stimulable phosphor is a divalent europium activated halide phosphor.

15. The radiation image storage panel as claimed in claim 14, in which said divalent europium activated halide phosphor is a divalent europium activated fluorohalide phosphor.

* * * * *